United States Patent
Brum et al.

(10) Patent No.: US 6,441,517 B1
(45) Date of Patent: Aug. 27, 2002

(54) DRIVE MECHANISM FOR OSCILLATING ELECTRIC PRODUCTS OF PERSONAL USE, PARTICULARLY DRY SHAVERS

(75) Inventors: Thomas Brum, Oberursel; Alexander Klös, Hofheim; Holger Port; Werner Port, both of Schwalbach; Uwe Schaaf, Alsbach-Hähnlein, all of (DE)

(73) Assignee: Braun GmbH, Kronberg (DE)

( * ) Notice: Subject to any disclaimer, the term of this patent is extended or adjusted under 35 U.S.C. 154(b) by 6 days.

(21) Appl. No.: 09/885,993

(22) Filed: Jun. 21, 2001

Related U.S. Application Data

(63) Continuation of application No. PCT/EP99/08889, filed on Nov. 19, 1999.

(30) Foreign Application Priority Data

Dec. 23, 1998 (DE) .......................... 198 59 622

(51) Int. Cl.[7] .................. H02K 33/02; B26B 19/28
(52) U.S. Cl. ................... 310/37; 310/36; 30/45
(58) Field of Search ................ 310/36, 37, 38, 310/39, 15, 17, 28; 30/45

(56) References Cited

U.S. PATENT DOCUMENTS

| | | | |
|---|---|---|---|
| 3,434,082 A | 3/1969 | Montagu | 335/229 |
| 3,475,629 A | 10/1969 | Lagier | 310/36 |
| 3,842,340 A | 10/1974 | Brandquist | 321/45 R |
| 3,898,732 A | 8/1975 | Krainer | 30/43.92 |
| 3,919,606 A | 11/1975 | Nemoto | 318/128 |
| 3,922,589 A | 11/1975 | Peckingham | 318/126 |

(List continued on next page.)

FOREIGN PATENT DOCUMENTS

| | | | |
|---|---|---|---|
| CH | 334 787 | 1/1959 | |
| DE | AS 10 33 091 | 6/1958 | B26B/69/12 |
| DE | AS 16 13 069 | 7/1970 | H02K/33/06 |
| DE | 30 22 028 A1 | 12/1980 | H02K/33/10 |
| DE | 30 25 633 A1 | 1/1981 | H02K/33/18 |
| DE | 30 12 833 C2 | 10/1981 | H02P/6/02 |

(List continued on next page.)

OTHER PUBLICATIONS

Oberwallner, C., "Mit dem 2–Phasen–Schrittmotortreiber TCA 3727 weniger externe Bauteile und bessere Eigenschaften (trans.:"With the 2–Phase–Stepper motor driver TCA 3727 fewer external components and better characteristics")", Der Elektoniker, vol. 10, 1991, pp. 6–12. (month unknown).

Brandstaetter, A., "Regelkonzept für Schrittmotoren (trans.: "Control concept for Stepper Motors")", Technica, vol. 10, 1991, pp. 99–107 (month unknown).

German Patent Office search dated Apr. 4, 1997, 2 pages.

*Primary Examiner*—Nestor Ramirez
*Assistant Examiner*—Judson H. Jones
(74) *Attorney, Agent, or Firm*—Edward S. Podszus

(57) ABSTRACT

The invention is directed to a drive mechanism for driving a working unit, movable in a rotary oscillating manner, of domestic appliances, particularly dry shavers. The drive mechanism of the invention includes a permanent magnet motor which has a stator with an exciter winding and a rotor with at least one permanent magnet positioned in the stator field and rotatably mounted on a shaft, a reset device for returning the rotor to a position of rest in such a way as to enable the rotor to oscillate about the position of rest, a coupling device for coupling the rotor to the working unit, wherein the coupling device is connected to the rotor in spaced relationship to the rotor shaft, a detecting device for detecting the oscillatory motion of the rotor, and an actuating unit for actuating the permanent magnet motor in response to the detected oscillatory motion, provision being made for frequency control elements for actuating the permanent magnet motor with a frequency corresponding approximately to the resonant frequency of the rotor.

35 Claims, 16 Drawing Sheets

U.S. PATENT DOCUMENTS

| | | | |
|---|---|---|---|
| 4,320,448 A | 3/1982 | Okuda et al. | 363/134 |
| 4,431,953 A | 2/1984 | Schray et al. | 318/254 |
| 4,460,854 A | 7/1984 | Bauer | 318/114 |
| 4,772,828 A | 9/1988 | Heymans et al. | 318/128 |
| 5,632,087 A | 5/1997 | Motohashi et al. | 30/43.92 |
| 5,736,797 A | 4/1998 | Motohashi et al. | 310/36 |
| 5,753,985 A | 5/1998 | Redlich | 310/36 |
| 6,028,406 A * | 2/2000 | Birk | 318/254 |
| 6,133,701 A * | 10/2000 | Gokturk | 318/114 |
| 6,181,410 B1 * | 1/2001 | Ishida et al. | 356/4.01 |
| 6,229,231 B1 * | 5/2001 | Ishida et al. | 310/36 |
| 6,377,145 B1 * | 4/2002 | Kumagai | 335/274 |

FOREIGN PATENT DOCUMENTS

| | | | |
|---|---|---|---|
| DE | 31 39 523 A1 | 4/1983 | H02K/33/10 |
| DE | 31 39 523 C2 | 12/1984 | H02K/33/10 |
| DE | 38 33 358 C2 | 4/1989 | A61C/17/34 |
| DE | 38 11 844 C1 | 12/1989 | F02M/51/00 |
| DE | 41 17 225 A1 | 12/1992 | B06B/1/04 |
| DE | 41 17 227 A1 | 12/1992 | B06B/1/04 |
| EP | 0 674 979 B1 | 11/1997 | B26B/19/28 |
| EP | 0 860 933 A2 | 8/1998 | H02K/33/16 |
| JP | 61-157251 | 7/1986 | H02K/33/16 |
| WO | WO 95/26261 | 10/1995 | B26B/19/28 |

* cited by examiner

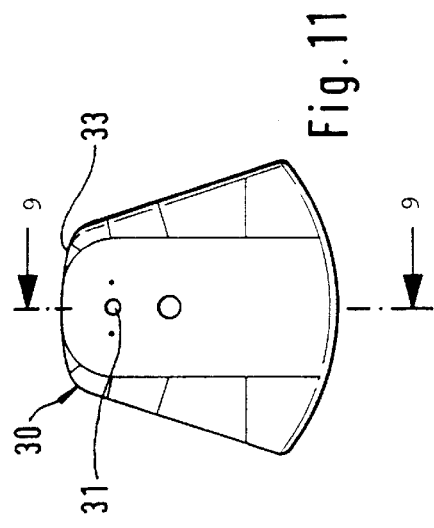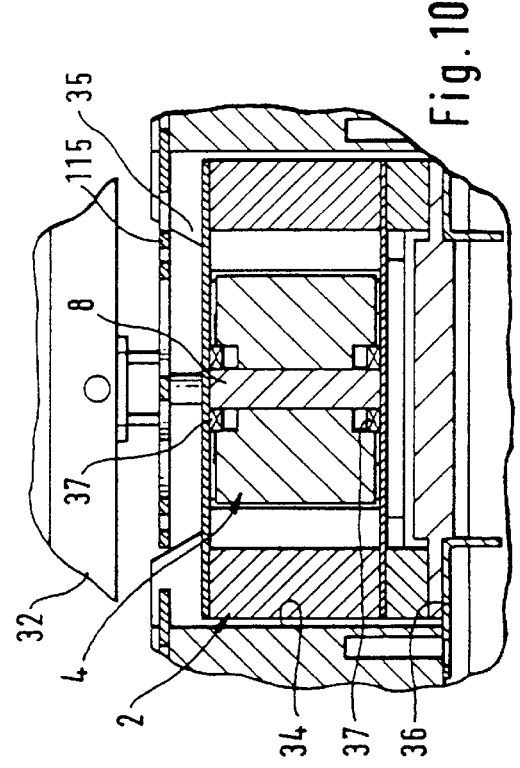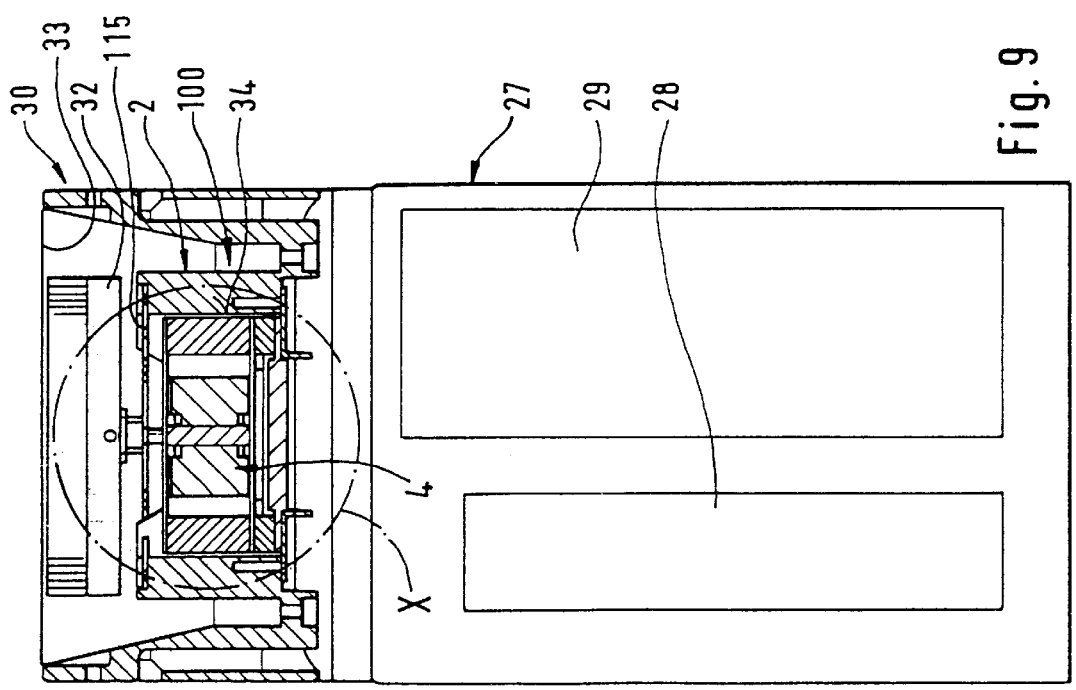

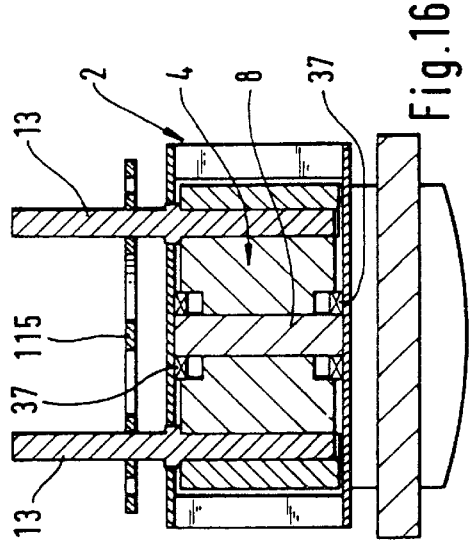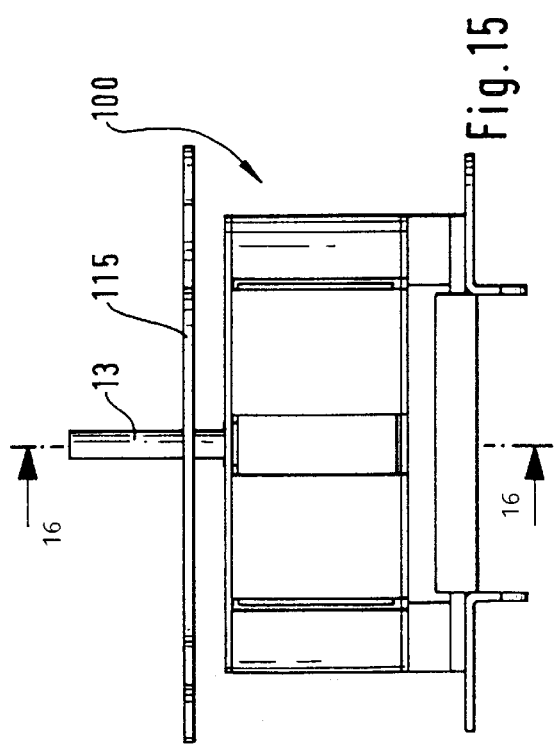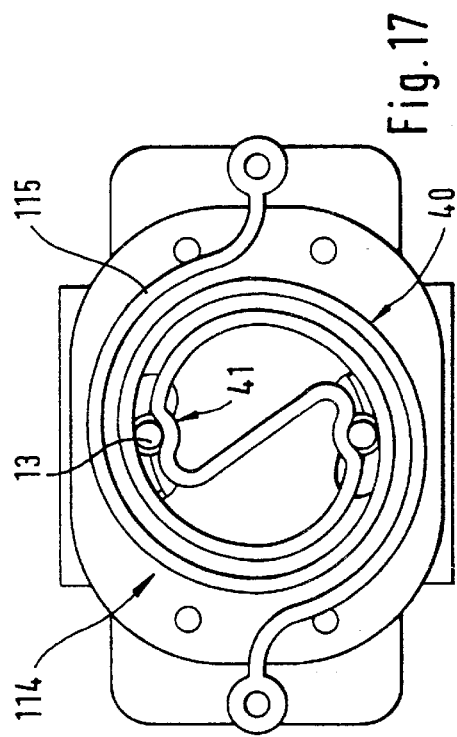

DRIVE MECHANISM FOR OSCILLATING ELECTRIC PRODUCTS OF PERSONAL USE, PARTICULARLY DRY SHAVERS

This is a continuation of International Application No. PCT/EP99/08889 with an International filing date of Nov. 19, 1999.

FIELD OF THE INVENTION

This invention relates to a drive mechanism for driving a working unit, movable in an oscillating manner, of electric products of personal use, particularly dry shavers.

BACKGROUND

Dry shavers which cut off beard hairs with a reciprocating cutter block are known examples of household appliances with an oscillating working unit. Oscillating dry shavers are traditionally driven by a rotary electric motor, for example a direct current motor. The rotary motion of the motor shaft is transformed into a linear oscillatory motion through suitable eccentric gearing.

Unlike gear solutions of this type, the linear oscillatory motion of the working unit may also be generated directly by a direct drive. This obviates the need to provide the eccentric gearing for transforming the rotary motor motion into a linear oscillation.

One form of a quasi linear direct drive is, for example, the so-called oscillating armature motor (cf., for example, DE 31 39 523 A1). Such oscillating armature motors are disadvantageous, however, on the one hand in that they can only be operated with a 220 volt line voltage, which makes them unsuitable for battery-powered appliances, and on the other hand in that they produce very large stray magnetic fields.

A vibratory drive for dry shavers is also known in which a rotor arrangement capable of performing rotary oscillations is connected to the cutter block by a cable control via deflection pulleys and drives said cutter block (cf. DE 41 17 225 A1) This vibratory drive which is operated with line voltage has a relatively low level of efficiency and is unsatisfactory with regard to its size and dimensions. The yieldability of the drive mechanism limits its efficiency.

A linear permanent magnet motor is also known as a direct drive for a dry shaver, in which a motion unit with permanent magnets is suspended from leaf springs in the manner of a suspension bridge above a stator with an exciter winding and drives a coupled cutter block (cf. WO 95/26261). A sensor monitors the speed of the motion unit, in dependence on which a controller modifies the electric power fed to the motor in such a way that the amplitude of oscillation of the motion unit is maintained constant. However, this known direct drive for dry shavers is complicated and less compact in design. The precision necessary for a good level of efficiency can only be achieved with a great outlay.

SUMMARY OF THE INVENTION

It is therefore an object of the present invention to provide an improved drive mechanism of the type initially referred to which avoids the disadvantages of known drives. In particular it is desirable for the drive mechanism to be of simple design and achieve stable operation with a high level of efficiency.

This object is accomplished according to the invention by a drive mechanism of the type initially referred to, with a permanent magnet motor which has a stator with an exciter winding and a rotor with at least one permanent magnet positioned in the stator field and rotatably mounted on a shaft, with a reset device for returning the rotor to a position of rest in such a way as to enable the rotor to oscillate about the position of rest, with a coupling device for coupling the rotor to the working unit, wherein the coupling device is connected to the rotor in spaced relationship to the rotor shaft, with a detecting device for detecting the oscillatory motion of the rotor, and with an actuating unit for actuating the permanent magnet motor in response to the detected oscillatory motion, provision being made for frequency control elements for actuating the permanent magnet motor with a frequency corresponding approximately to the resonant frequency of the rotor.

The rotary bearing arrangement of the permanent magnetic motion unit configured as a rotor affords the advantages of high stability and rigidity. Unlike a spring suspension in the manner of a suspension bridge in the case of the linear motor, the rotor with a rotary oscillating motor does not undergo any rocking motion. The rotary oscillating motor leads in a dry shaver to reduced foil wear and permits a smaller distance to be maintained between the foil and the cutter blocks. Advantageously, the air gap between the rotor and the stator can be very small, in particular around 0.5 mm or less. On account of the rotary bearing arrangement there is no risk of contact between the rotor and the stator. This results in a high level of efficiency.

The working unit is not coupled to the rotor shaft but is eccentrically connected directly to the body of the rotor by the coupling device. Favorable leverage ratios and a high level of rigidity are thus achieved. The rigid and direct transmission of the rotor's rotary motion to the working unit displays a high level of efficiency, particularly for oscillations of high frequency far in excess of the line frequency, and is the reason for such high-frequency oscillations being at all possible.

The actuating unit, to which the oscillatory motion of the rotor is fed back via the detecting device connected thereto, actuates the exciter winding of the stator such that the rotor oscillates with a frequency corresponding approximately to the resonant frequency of the system comprised of the rotor and the reset device. Operation at resonance achieves a very high degree of efficiency. Unlike weighty line-operated appliances with a low level of efficiency it is possible, on account of the actuating unit, to achieve very high operating frequencies in the range of $10^4$ min$^{-1}$, thus enabling the shaving time to be shortened. In conjunction with the rigid coupling of the working unit it is possible to compensate for load peaks, such as occur during shaving, very quickly, particularly from one half cycle to the next. This leads to a higher quality and speed of processing. As a result of the high level of efficiency the drive mechanism can be built to small dimensions. Together with the motion element's configuration as a rotor it is thus possible to achieve a highly compact design.

According to a preferred embodiment of the invention the rotor has various sections made of various materials. In particular the rotor may have an inner lying core made of a soft magnetic material of high permeability and poles made of a permanent magnetic material. Conversely, it is also possible for the rotor to have an inner lying core of permanent magnetic material and poles made of a soft magnetic material of high permeability. On account of smaller stray losses of the poles made of permanent magnets, the air-gap field and hence the output power and efficiency of the drive are greater than with the second arrangement. Furthermore, the inductance of the motor viewed from the terminals of the exciter winding is smaller. Consequently the current is allowed to increase more quickly, which again raises the output power. The rotor is advantageously configured so that the inductance is independent of the rotor's position. This simplifies the electronic actuation of the motor. It is also an advantage for the rotor shaft to be worked into the soft magnetic material and not into the magnet material, which is relatively hard to machine. This simplifies production substantially.

It is also possible for the rotor to be comprised completely of permanent magnetic material. In this case the rotor shaft is preferably not made of permanent magnetic material. The embodiment in which the rotor is made completely of permanent magnetic material is particularly advantageous with regard to the level of efficiency. However, the previously mentioned embodiment has advantages with regard to production and machining.

According to a preferred embodiment of the invention the reset device is connected to the rotor in spaced relationship to the rotor shaft. Hence the reset device does not engage the rotor shaft. Precise oscillation of the rotor is effected using a lever arm acting on the rotor. It will be understood that the reset device can also act on the working unit. The resetting force is preferably transferred to the rotor via the coupling device which connects the working unit to the rotor. Hence the reset device is operatively associated with the coupling device.

Resetting the rotor from its displaced positions to its position of rest may be effected in a variety of ways. By way of example, the spring-type resetting force can be generated by magnetic fields, for example resetting magnets can be attached to the rotor to act as a magnetic resetting device. Magnetic resetting forces can also be used in combination with other reset devices. Preferably, however, resetting the rotor is effected by a mechanical spring device. Leaf springs or helical springs can be used for this purpose. The reset device preferably includes a return spring with a fastening section for fastening to the rotor and a coil section surrounding the fastening section. In this way it is possible to obtain a particularly compact and space-saving arrangement of the reset device. The reset device is preferably arranged on the end of the motor, in particular it is possible for the fastening section to be connected to the rotor at its end.

The return spring is preferably of a plane configuration in order for the reset device to take up only little structural space. The fastening section and the coil section surrounding it extend in one plane. The thickness of the return spring is determined by the thickness of the material.

A particularly favorable configuration of the return spring is obtained by constructing the fastening section in an essentially Z-shaped configuration with a pair of engagement sections lying opposite and essentially parallel to each other, and by providing the coil section with a pair of coil arms extending outwardly in spiral shape from the engagement sections. The engagement sections are designed to bend resiliently such that the relative distance of the engagement sections is variable. Hence the return spring can be straddled in place with its engagement sections. The spring body of the return spring consisting preferably of spring steel can be constructed with various cross-sections, but preferably it is rectangular.

According to an advantageous embodiment of the invention the rotor is arranged standing, i.e., with its end facing the working unit. The coupling device is arranged on one end of the motor. It is thus possible to obtain a very compact design. The working unit can be arranged in very close proximity to the rotor without being hindered by the stator. The freedom of stator design remains unrestricted.

According to a further advantageous embodiment of the invention it is also possible for the rotor to be arranged lying, i.e., the peripheral side of the rotor faces the working unit. The coupling device is preferably arranged on the peripheral side of the rotor. This arrangement has advantages with regard to the bearing of the rotor. The end of the rotor does not need to be accessible for the coupling device, resulting in greater freedom of design for supporting the rotor shaft.

In a further aspect of the invention the coupling device is constructed to be unyielding in the direction of movement of the working unit and with play in a direction perpendicular to the direction of movement of the working unit. Hence the coupling device is yielding vertically to the direction of movement of the working unit while being rigid in this direction of movement. The driving motion of the rotor is transferred to the working unit directly, without delay and with precision. Yieldability perpendicular to the direction of movement permits a corresponding component motion resulting from the rotation of the rotor to be compensated.

To obtain a simple design of the coupling train with a high level of stiffness, the coupling device is preferably made of only two parts. A first coupling element which is fixedly connected to the rotor, and a second coupling element which is fixedly connected to the working unit, are in direct engagement with each other, the two coupling elements being preferably rigid. Providing the coupling device with only two rigid elements enables direct transmission of the drive motion without delay and permits high frequencies of oscillation. Yieldability, as exists with known coupling devices operating with cable controls, is avoided.

A particularly simple and rigid construction is achieved when one coupling element is a pin and the other coupling element a cutout, particularly an elongate slot. It will be understood that the arrangement of the two coupling elements is interchangeable. However, the pin is preferably disposed on the rotor and the cutout on the working unit. This simplifies the assembly of the reset device, enabling it to be mounted independently of the working unit, in addition to facilitating the handling of the working unit during cleaning or the like. In cases where the coupling device is arranged on the end of the rotor, the pin preferably extends parallel to the rotor shaft. In cases where the arrangement is on the peripheral side of the rotor, the pin preferably extends perpendicularly to the rotor shaft.

In a further aspect of the invention provision is made for a pair of coupling devices which are associated with various working units and arranged on opposing sides of the rotor shaft in such a way that the working units are driven in counter-running direction. The counter-running motion of the working units effects a reduction of vibrations, for example, on parts of the housing, the inertias of the working units counterbalancing each other. The arrangement of the coupling devices on opposing sides of the rotor shaft is advantageous particularly in connection with the standing arrangement of the rotor. The corresponding coupling elements are rigidly connected to the rotor. The coupling devices are rigidly interconnected by the rotor. The working units oscillate in exactly opposite directions. They oscillate with the same frequency of oscillation even under the imposition of different loads to the working units. Actuation of the motor is thereby simplified.

In accordance with yet another advantageous configuration of the invention provision may be made for several rotors, each of which is associated with one working unit. Hence each working unit is driven by a rotor of its own. In this arrangement each rotor may be optimally adapted to the corresponding working unit. Preferably the rotors have a common shaft. This simplifies the structural design of the drive mechanism. It will be understood that the rotors may be of the same sign and oscillate in phase. However, the rotors preferably have different directions of magnetization such that they oscillate in opposite directions to each other. This reduces vibrations to a large extent. Not only the inertias of the working units but also the inertias of the rotors counterbalance each other.

The oscillatory motion of the rotor is detectable by way of various quantities of motion. To control the energy supplied to the motor it is possible, for example, to detect the rotor displacement or the resetting force of the reset device acting on the rotor and to feed these quantities back to the actuating unit. However, the rotor speed is preferably detected as the quantity of motion characteristic of the rotor oscillation and fed back to the actuating unit for actuating the motor.

It will be understood that the oscillatory motion is detectable by various sensors, e.g., Hall probes or optical sensors.

An advantageous configuration of the invention resides in that the detecting device comprises a sensor device for detecting a stray flux created by the permanent magnet of the rotor. Detecting the rotor's oscillatory motion is thus performed without the help of any auxiliary magnets. The rotor motion is detected by means of the magnetic flux originating directly from the permanent magnet of the rotor. The permanent magnets form part of the detecting device.

The detecting device is preferably integrated in the stator, a being in particular arranged on a pole shoe of the stator. In this arrangement the sensor coil may simply be wound around a tooth of a pole shoe of the stator. The advantage of integrating the detecting device in the stator is that it enables a space-saving, compact design of the drive mechanism to be achieved.

To enhance the accuracy of detection of the oscillatory motion of the rotor, the detecting device includes a compensating device to compensate for an error content in the signal of the sensor device. In addition to the flux of the permanent magnets it is possible for the magnetic flux of the exciter winding proportional to the motor current to induce a voltage in the sensor device whose fundamental wave is contained likewise in the output signal of the sensor device. The compensating device preferably has a current sensor for detecting a motor current and a subtraction unit for subtracting a current sensor signal proportional to the motor current from the signal of the sensor device. Hence the detecting device provides, independently of the operating state of the motor, an output signal which is a measure of the rotor speed. The motor can thus be controlled so that for different loads the motor runs at its resonant frequency with a constant cutter speed.

The process of detecting the oscillatory motion of the rotor may also be performed indirectly. According to another embodiment of the invention the drive mechanism has no oscillation sensor. A signal proportional to the motor current is fed back to the actuating unit. A movement of the permanent magnetic rotor has a direct effect on the motor current via the voltage induced in the stator coil. The motor current can be detected with a suitable current sensor and this signal is fed back instead of the signal of a motion sensor to the actuating unit in order to actuate the motor. Using a second signal, which is a measure of the fundamental wave amplitude of the terminal voltage driving the motor, together with the motor current signal it is possible to draw a conclusion about the voltage induced in the motor. This voltage is proportional to the rotor speed, thus enabling this quantity to be controlled at different loads.

To effect the desired oscillation of the rotor the actuating unit controls the electric energy fed to the motor in response to the rotor's oscillatory motion by means of a control device. The control device includes a peak value detector for detecting a signal peak value from the detecting device and controls the energy fed to the motor in response to the detected peak value. Reducing the oscillation signals to one value simplifies the actuation of the exciter winding without noticeably impairing the accuracy. The detected peak value can be compared to a setpoint value and the energy fed to the motor can be controlled in response to the difference.

To exert an influence on the rotor's oscillatory motion it is possible to modify the energy supply to the motor in various ways. The actuating unit preferably has a signal generator for actuating the motor with bipolar voltage pulses, wherein provision is made for a modulating device for modulation of the voltage pulses as a function of the oscillatory motion of the rotor. According to a first configuration of the invention it is possible to exert an influence on the amplitude of oscillation of the rotor by effecting a phase modulation of the bipolar pulses, i.e., a process referred to as pulse-phase modulation. A displacement of the bipolar voltage pulses relative to the oscillation cycle of the rotor can be performed by means of a phase shifter controllable by the control device. According to a further configuration of the invention it is possible for the electric power fed to the drive mechanism to be controlled by pulse-amplitude modulation. In this process the amplitude of the voltage pulses is modified, thereby controlling the quantity of electric energy in a voltage pulse. In particular it is also possible for the output signal of the signal generator to be modulated in such a way that the bipolar pulses for actuating the motor are affected in their pulse duration by the controller. Hence with a process referred to as pulse-duration modulation the duration of the voltage pulse is modified, thus effecting a variation of the power fed to the motor. It will be understood that it is possible to combine the various forms of modulation with each other. However, using a single form of modulation simplifies the electronic control devices and achieves a sufficient level of accuracy.

According to a preferred configuration of the invention the signal generator is configured such that the voltage pulses are generated in a constant phase relationship to the rotor's oscillatory motion. If pulse-duration modulation is performed to control the amount of energy supplied, then contrary to pulse-duration modulations customary for similar applications, the voltage pulses are not generated at a fixed starting instant involving modification of only the end of the voltage pulses, but instead the drive pulses are widened or narrowed symmetrically on both sides. A rigid phase coupling between the fed back sensor signal, which is characteristic of the rotor's oscillatory motion, and the fundamental wave of the pulse-duration-modulated drive pulses is thus obtained even with a changed pulse duty factor of the pulse-duration modulation. A particularly high level of efficiency is thereby achievable. The permanent magnet motor is operated exactly in resonance.

At least one variable direct voltage level is preferably generated by the control device and compared, by means of suitable comparators, to a triangular signal generated by the signal generator synchronously with the oscillation of the rotor, the pulse duration of the voltage pulses being fixed according to the points of intersection of the triangular signal with the direct voltage level.

It will be understood that the process of actuating the motor with the bipolar voltage pulses may take place in a variety of ways. According to one embodiment of the invention the frequency control elements include an oscillator for actuating the rotor with a predetermined frequency. This predetermined frequency preferably corresponds approximately to the resonant frequency of the rotor in conjunction with the reset device.

To achieve a particularly high level of efficiency and to effect operation in resonance even on variations of the resonant frequency, the frequency control elements according to a further embodiment have a self-oscillating feedback loop. This loop may include in particular a phase shifter for the signal of the detecting device, the signal generator for determining the sequence of the bipolar voltage pulses, a power stage for actuating the motor, and the control device for controlling the electric energy fed to the motor. The great advantage of actuating the motor in a self-oscillating loop is that the actuating frequency is invariably maintained exactly resonant, i.e., independently of a resonant frequency shift, for example due to loading of the drive mechanism with a speed-dependent force. Dips in the amplitude of oscillation due to the actuating system falling out of step are avoided.

An important aspect, particularly for dry shavers, is to achieve a compact arrangement of the drive mechanism. The shavers should be on the whole small and handy while, on the other hand, space is needed sufficient to receive an energy store such as a storage battery. Advantageously designed dry shavers have a pivot head which can be pivoted relative to a shaver housing and carries at least one cutter unit adapted to be driven by the drive mechanism. As a result of the pivot head it is possible to achieve an optimal placement of the cutter unit against the facial contour to be shaved. According to a further aspect of the invention a dry shaver of the type initially referred to has the drive mechanism integrated in the pivot head.

Hence the drive mechanism is pivotal together with the pivot head relative to the shaver housing. A particular advantage of this arrangement is that it enables greater mobility of the pivot head. The coupling of the drive mechanism to the at least one cutter unit needs to display no degree of freedom or mobility because relative motion between the cutter unit, which is pivotal with the pivot head, and the drive mechanism is unnecessary. The drive mechanism pivots with the pivot head.

According to a preferred configuration of the invention the drive mechanism with the rotor shaft is arranged standing, in particular the pivot axis of the pivot head can be vertically intersected by the rotor shaft. In a position of rest of the pivot head, i.e., in a position that is not pivoted out of the shaver housing, the rotor shaft can extend parallel to the longitudinal axis of the shaver housing. Several parallel cutter units can advantageously be driven by a rotor in opposite directions and be rigidly coupled together.

A particularly low-vibration configuration is obtainable by arranging the rotor shaft in a lying position.

The present invention will be explained in more detail in the following with reference to embodiments and associated drawings.

BRIEF DESCRIPTION OF THE DRAWINGS

FIG. 9 is a side view of a dry shaver with a drive mechanism integrated in a pivot head of the dry shaver, according to an embodiment of the invention, with a partial sectional view taken along the line B—B of FIG. 11;

FIG. 10 is an enlarged detail view of the part of the pivot head marked with X in FIG. 9, showing the drive mechanism in a sectional view;

FIG. 11 is a side view of the pivot head of FIG. 9;

FIG. 15 is a side view of the permanent magnet motor of the drive mechanism according to the embodiment of FIGS. 9 to 14;

FIG. 16 is a sectional view of the motor taken along the line A—A of FIG. 15;

FIG. 17 is a top plan view of the motor of FIG. 15, showing the return spring;

DETAILED DESCRIPTION OF PREFERRED EMBODIMENTS

Figure 1:
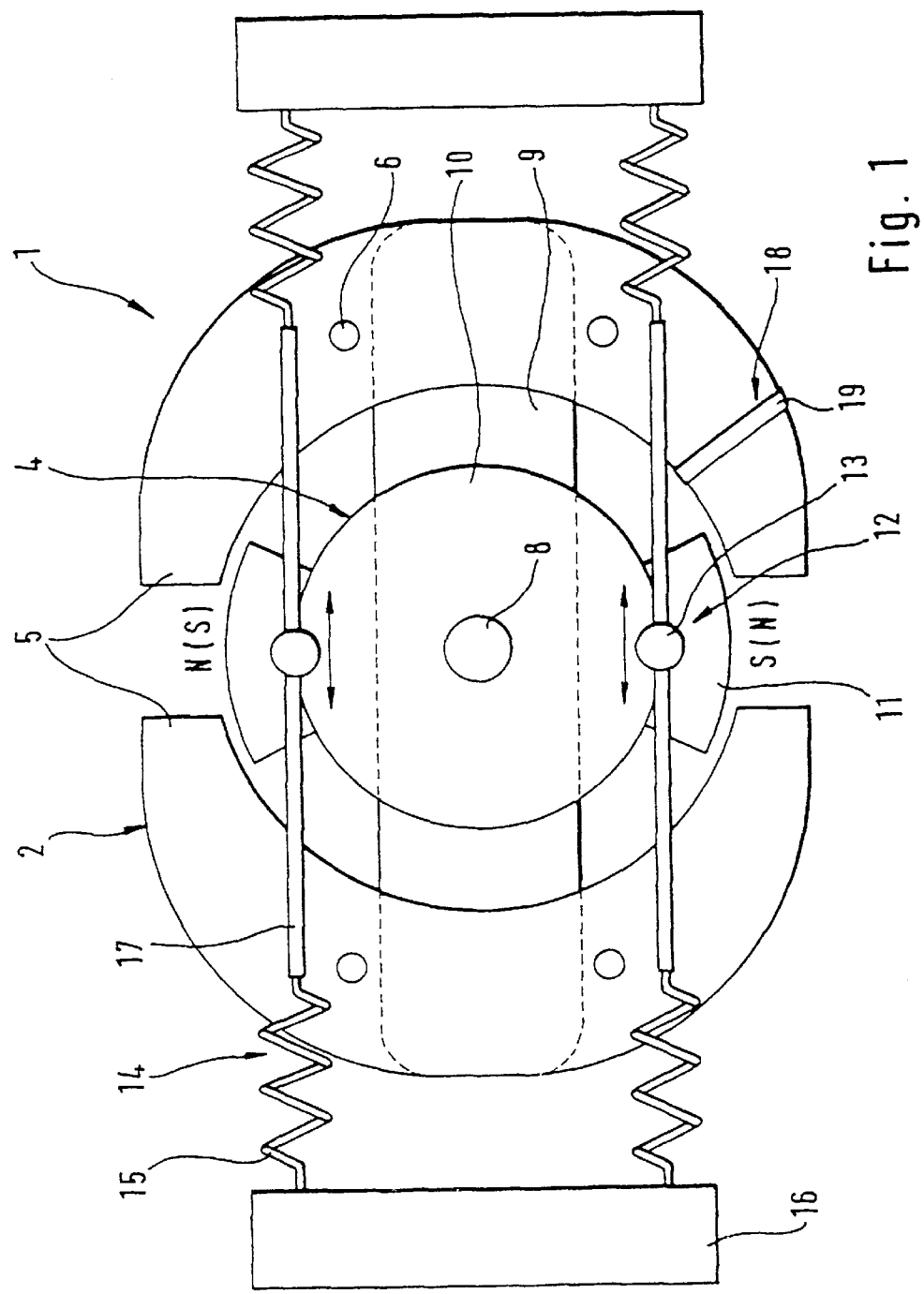
FIG. 1 is a schematic top plan view of an oscillating single-phase brushless direct current motor of a drive mechanism according t a first embodiment of the invention.
Figure 2:
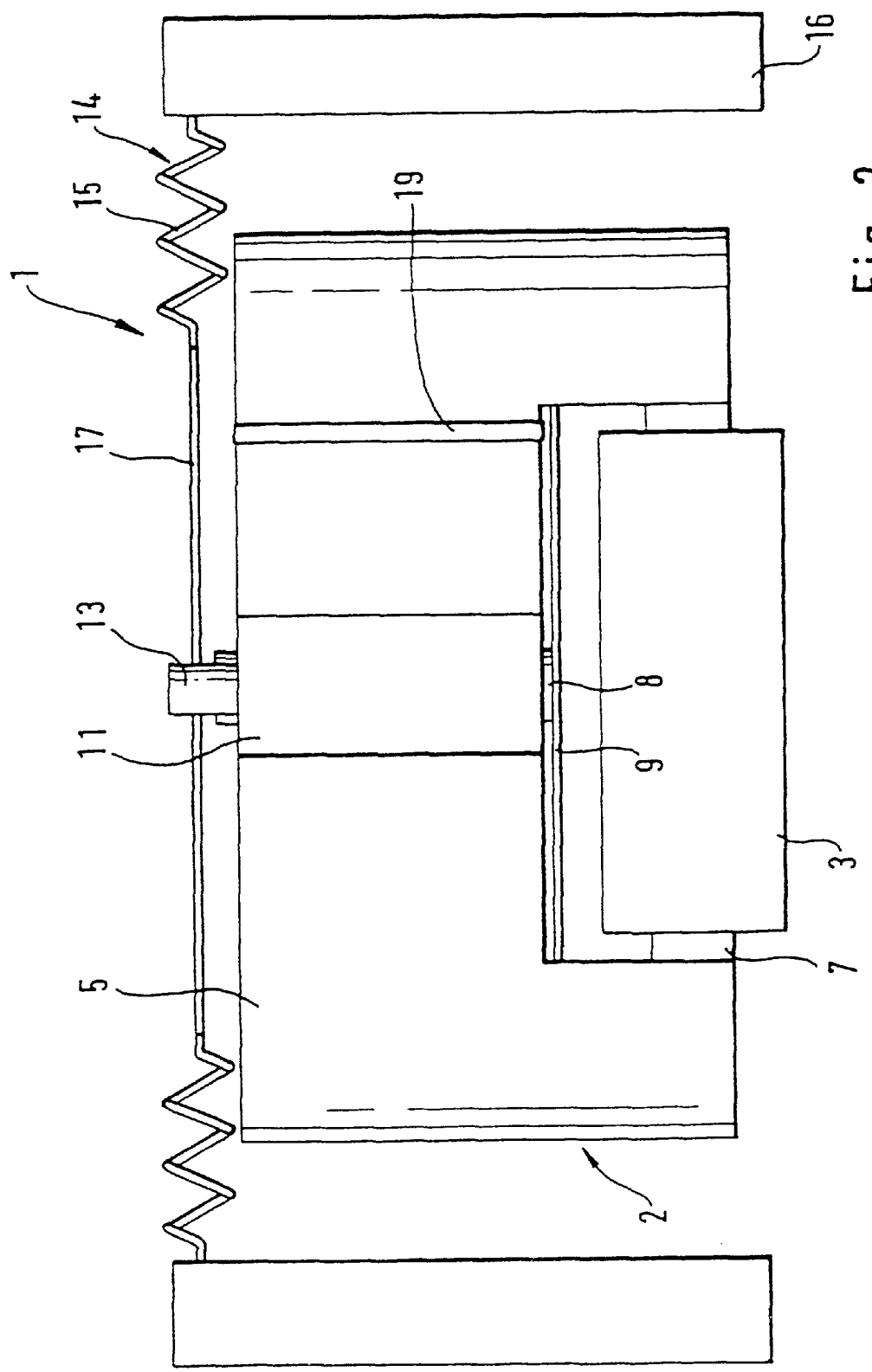
FIG. 2 is a schematic side view of the motor of FIG. 1.

The permanent magnet motor 1 of a drive mechanism constructed according to the embodiment of the invention of FIGS. 1 and 2 has a stator 2 with an exciter winding 3 and, as a motion element, a rotor 4 disposed in the field of the stator 2.

The stator 2 has a stator yoke comprising two pole shoes 5, each bent in an approximately semi-circular configuration so that they define between them a circular cylindrical space. The pole shoes 5 are constructed of arcuate iron plates extending perpendicularly to the longitudinal axis of the inner space bounded by the pole shoes 5. The iron plates are positioned relative to each other by centering pins 6. The two pole shoes are joined together at a bottom end by a stator frame 7, which is preferably constructed likewise of iron plates. The exciter winding 3 is wound around the stator frame 7 (cf. FIG. 2). The stator 2 may also be made of a different soft magnetic material of high permeability instead of iron plates.

The rotor 4 is disposed in the space between the two halves of the stator 2 and extends with its shaft 8 along the longitudinal axis of the cylindrical space. The rotor shaft 8 is rotatably mounted in respective bearings at both the bottom end and the top end of the pole shoes 5. A suitable end shield 9 is provided at both the bottom and top end of the pole shoes 5 for this purpose. The rotor 4 could also be mounted at just one end, but it is preferably mounted at both ends because such a bearing arrangement effects a higher level of rigidity and enables a smaller gap between the rotor and the pole shoes.

The rotor 4 has a core made of a soft magnetic material, in particular iron, in which the rotor shaft 8 is disposed. The core 10 may be given various shapes, but it preferably is circular cylindrical in cross-section. Two shell-shaped permanent magnets 11 are arranged in diametrically opposing position on the peripheral side of the core 10 of the rotor 4. The permanent magnets 11 may each extend in a sector of up to 180° around the core 10. In particular the permanent magnets may each extend at an angle of 40° to 100°, in particular approximately 70°, in sector shape around the core 10. The permanent magnets may be radially or diametrically magnetized. The axes of magnetization of both permanent magnets 11 point in the same direction, hence in FIG. 1 either up or down. The permanent magnets 11 are arranged on the core 10 in such a way that they are exactly opposite the gaps between the two pole shoes 5 when the rotor is in a position of rest (cf. FIG. 1).

As a coupling device 12 for transmitting a drive motion of the rotor 4 to cutter units, not shown in greater detail in FIGS. 1 and 2, of a dry shaver, the rotor 4 carries on its upper end two projecting driving pins 13 which are connected to and drive the cutter units. The coupling device 12 is thus arranged at the top end of the rotor 4. The driving pins 13 are arranged in spaced relationship to the rotor shaft 8 and preferably arranged approximately on the outer circumference of the rotor in order to obtain favorable leverage ratios. As FIG. 1 shows, the driving pins 13 are arranged in particular between the core 10 and the permanent magnets 11 of the rotor 4. This can be used as a mounting and/or positioning aid for the permanent magnets 11.

During operation the rotor 4 performs small angular oscillations, as will be explained in more detail in the following. The maximal angle amplitudes lie preferably in the range from ±5 to ±20, being in particular of the order of about ±12. The small angles of rotation effect a rotary oscillation of the driving pins in the direction of movement of the cutter blocks, in FIG. 1 from left to right and vice versa. The sideways movements associated with the rotary oscillation across the direction of movement of the cutter units, in FIG. 1 up and down, are very small, amounting at most to 0.1 mm, approximately. These small sideways movements may be counterbalanced by providing for a corresponding yieldability of the coupling device across the actual direction of movement, in particular the complementary cutouts in the cutter units, with which the driving pins 13 are in engagement, may be constructed as elongate slots. Through the arrangement of the driving pins 13 on opposing sides of the rotor shaft 8 the small rotary oscillations of the rotor 4 are transformed into a counter-rotating reciprocating motion of the dry shaver's cutter units coupled to the driving pins 13. The counter-rotation reduces housing vibrations and noise emissions. In addition to this, the cutter units are rigidly coupled to each other via the rotor 4. They oscillate exactly in opposite direction with the same frequency.

To achieve a maximum possible oscillation amplitude of the cutter units and a maximum possible efficiency of the drive mechanism it is an advantage to equip the rotor 4 with a spring-type resetting force about the position of rest shown in FIG. 1 and to select the excitation frequency equal to the resonant frequency of the coupled electromechanical spring-and-mass system, as will be explained in more detail below. In the embodiment of FIGS. 1 and 2 four helical springs 15 are provided as a reset device 14 for returning the rotor 4 upon displacements from its position of rest to said position of rest. The return springs 15 have one end fixedly attached to a return spring fixing device 16, for example a portion of the shaver housing, while their other end is coupled to the rotor 4. The return springs 15 do not engage the shaft 8 of the rotor 4 but are fastened in spaced relationship to the shaft in an eccentric position on the body of the rotor 4, being in particular connected to the driving pins 13 of the coupling device 12. As FIG. 1 shows, the return springs 15 are each connected in pairs to one of the driving pins 13 via reset coupling elements 17. Rigid rods or plates, which preferably are rotatably attached to approximately the middle of the driving pins 13, are provided as reset coupling elements.

Unlike in FIG. 1 the reset coupling elements 17 are preferably constructed with sufficient width to cover the top end shield 9 and extend outward as far as the edge of the stator 2. In this way the reset coupling elements 17 and the top end shield 9 seal off the interior of the motor from fouling hairs and moisture. Hence provision is preferably made for sealing off the interior of the motor.

A Instead of the described coupling of the return springs 15 to the driving pins 13, the springs could also be inserted between the ends of the cutter units driven by the rotor 4 and suitable return spring fixing devices, for example the shaver housing. In this arrangement the springs bear with one end against the cutter units and with another end against the shaver housing.

To detect the oscillatory motion of the rotor 4 provision is made for a detecting device 18 having a sensor coil 19 which picks up the magnetic flux created by the permanent magnets 11. There is no need for any auxiliary magnets attached to the rotor 4. As FIG. 1 shows, the sensor coil 19 is integrated in the stator 2. In this configuration the sensor coil 19 is simply wound around a tooth of a pole shoe 5. Movement of the rotor 4 with its permanent magnets 11 causes a changing magnetic flux to pass through the sensor coil 19. The induction voltage thereby produced is a measure of the speed of rotation of the rotor 4 and may be used as an oscillation signal. The voltage induced in the sensor coil 19 also contains a fraction of the changing current of the exciter winding 3. This fraction superimposes as an interference signal on the actual oscillation signal. As is explained in more detail in the following, this interference component is compensated by a compensating device.

It is also possible to provide a flat, coil-shaped torsion spring instead of the four helical springs as a reset device 114. The torsion spring 115 bears against the two driving pins 13 of the rotor 4 and has its outer ends attached to the stator 2 or another fixed point on the shaver housing. The use of such a torsion spring 115 permits a particularly compact design of the permanent magnet motor 100. The configuration of FIGS. 3 and 4 corresponds to the configuration of FIGS. 1 and 2. Corresponding components are identified by the same reference numerals as in FIGS. 1 and 2.

Figure 5:
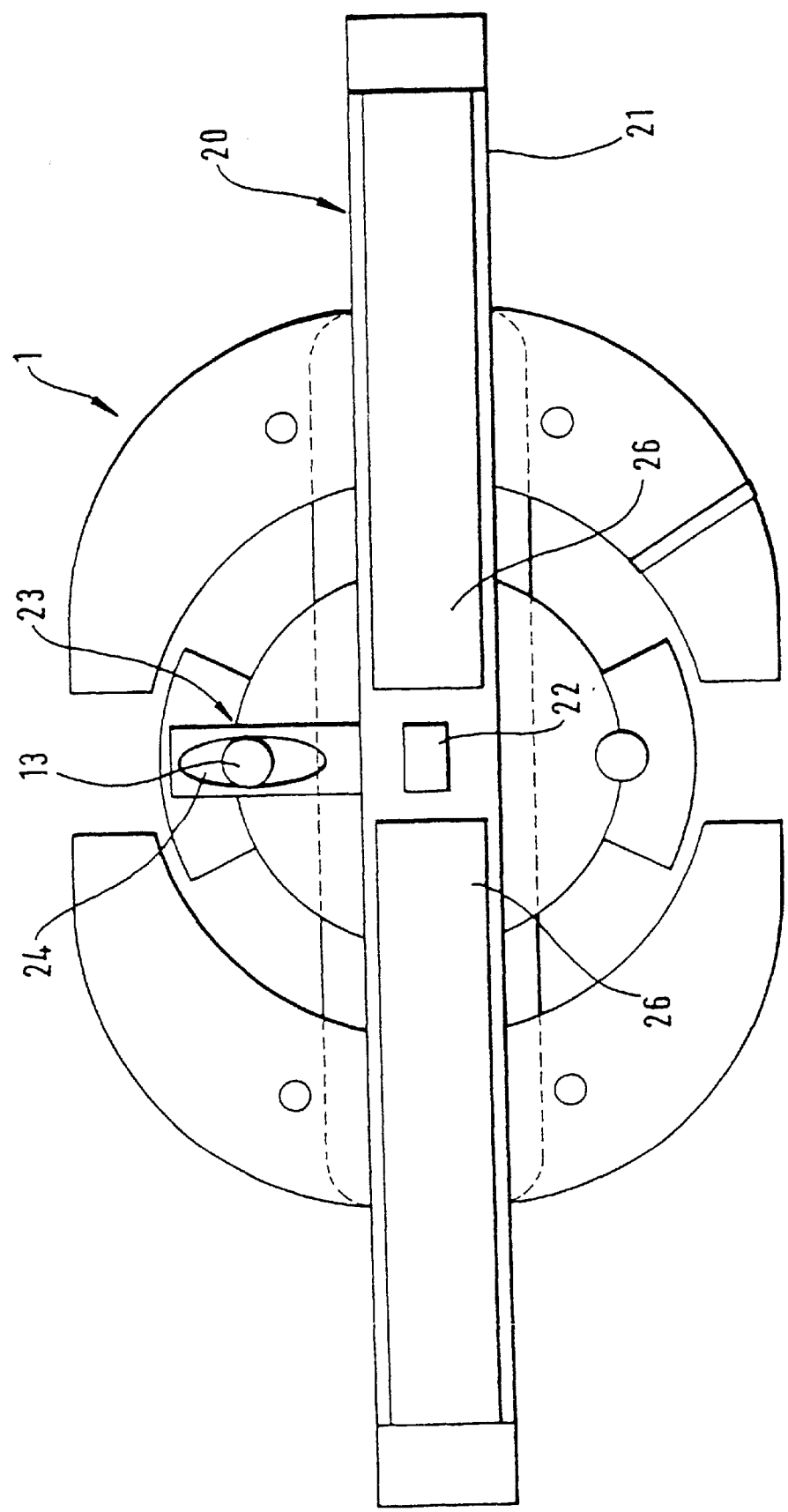
FIG. 5 is a schematic top plan view of the motor of FIG. 3, showing the coupling of a central cutter via an oscillating bridge.
Figure 6:
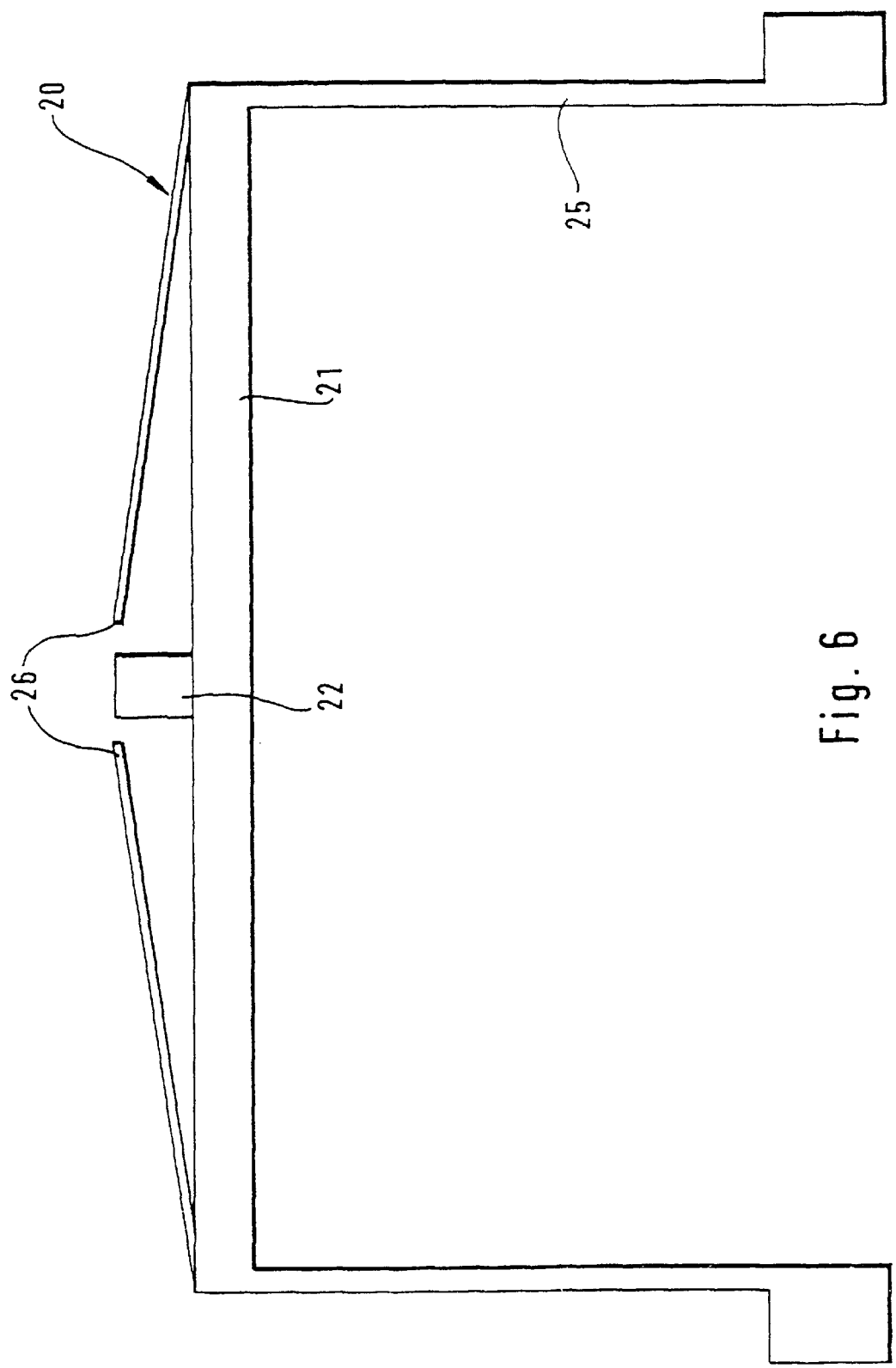
FIG. 6 is a schematic side view of the oscillating bridge of FIG. 5.

It is also possible for more than two cutter units to be coupled to the two driving pins 13. In particular it is possible to couple to one of the two driving pins 13 not only a cutter unit but also a central cutter as found on modern shaver cutter heads between the two outboard parallel cutter blocks. As FIG. 5 shows, the central cutter, not shown in more detail, may be operatively associated with one of the driving pins 13 by means of an oscillating bridge 20. For this purpose the oscillating bridge 20 has a motion element 21 which is disposed in an approximately central position above the end of the rotor 4 and mounted for movement in linear direction parallel to the direction of movement of the cutter units, that is, from left to right and vice versa according to FIG. 5. The motion element 21 includes a driving element 22 which can be brought into engagement with the central cutter and transmits the movement of the motion element 21 to the central cutter. The motion element 21 itself is caused to move by one of the driving pins 13. For this purpose the motion element 21 has a rigid coupling element 23 which is rigidly connected to the motion element 21 and is in engagement with the driving pin 13. For this purpose the coupling element 23 has a cutout 24 into which the driving pin 13 engages. The cutout 24 is constructed as an elongate slot whose longitudinal axis extends perpendicularly to the direction of movement of the motion element 21 in order to compensate for that component of the drive motion of the driving pin 13 across the direction of movement of the motion element 21 which results from the rotary movement of the rotor 4. However, in the direction of movement of the motion element 21 the engagement between the coupling element 23 and the driving pin 13 is free of play, that is, the coupling of the oscillating bridge 20 to the rotor 4 is kinematically rigid in this direction of movement, in order to reduce vibrations and noise emissions and to enable an exact oscillation of the rotor 4. The oscillating bridge 20 is mounted for movement in quasi linear direction by means of leaf springs 25. As FIG. 6 shows, the leaf springs 25 extend essentially normal to the motion element 21, to whose ends they are each connected by one of their ends. The leaf springs 25 extend down along the side of the stator 2 and have their other ends fixedly supported on a suitable fixing device, for example on the shaver housing. As FIG. 6 shows, the oscillating bridge 20 is equipped with an expanding spring 26 urging the central cutter, not illustrated in greater detail, in upward direction. Under the imposition of a load the central cutter can give way somewhat in downward direction. Desirably, the expanding spring 26 generates a smaller force than the expanding springs of the cutter blocks arranged on either side of the central cutter. The expanding spring 26 preferably has two leaf-spring-type spring legs which extend above the motion element 21 and spread resiliently up and away from it.

Figure 7:
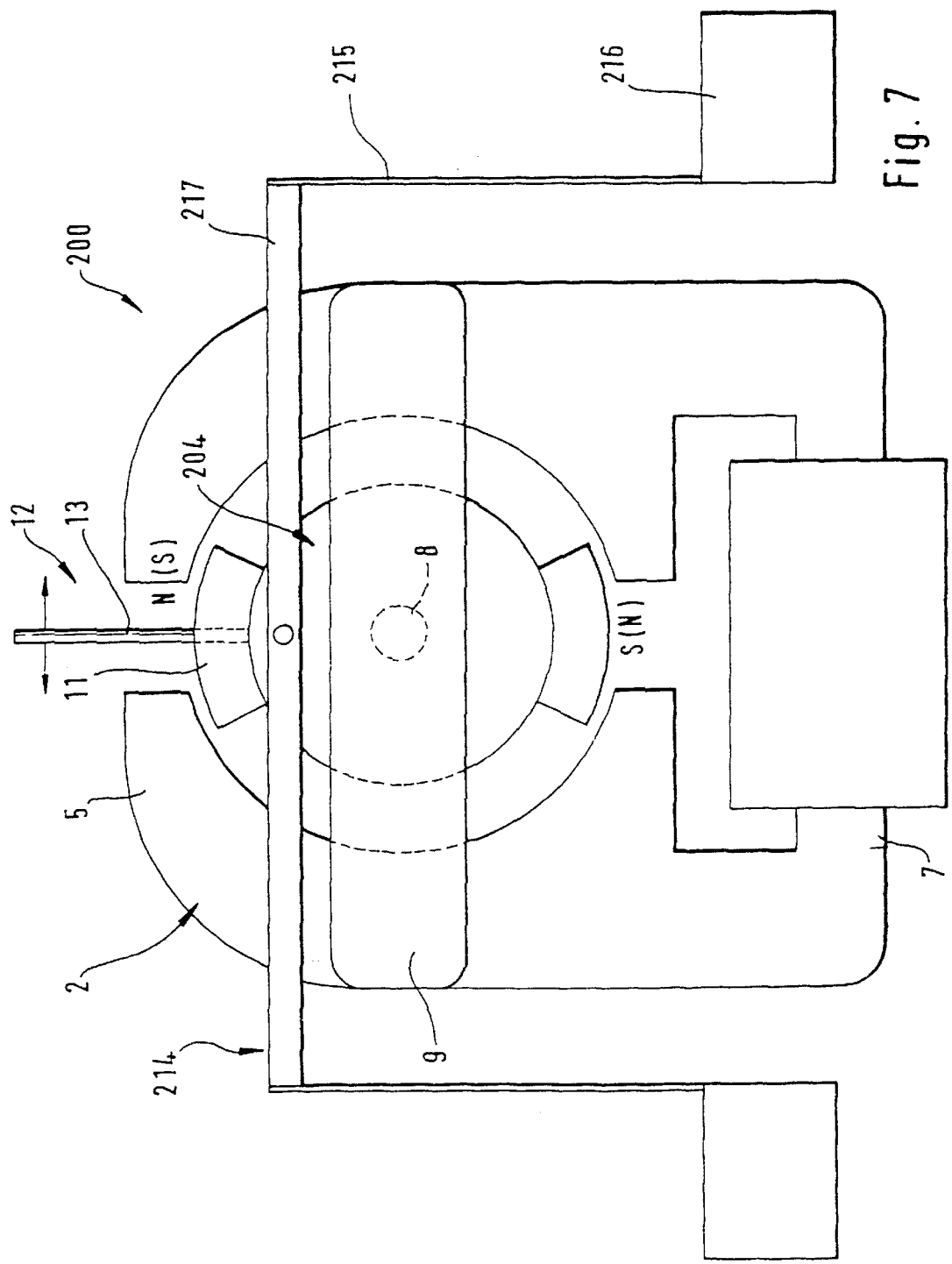
FIG. 7 is a schematic side view an oscillating single-phase brushless direct current motor according to a further embodiment with a lying arrangement of the rotor looking in the direction of the rotor shaft.
Figure 8:
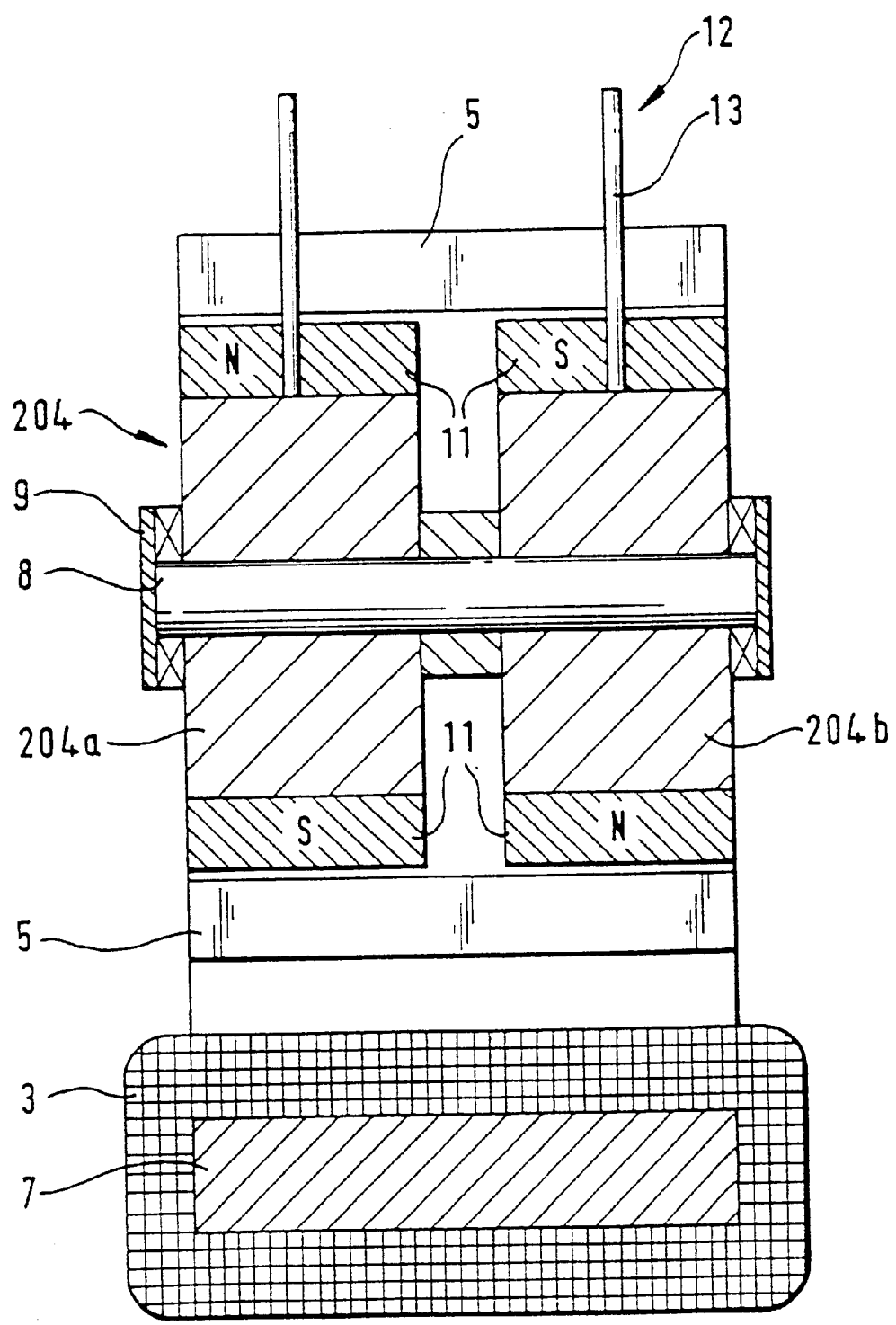
FIG. 8 is a schematic view of the motor of FIG. 7 in a center section containing the rotor shaft.

FIGS. 7 and 8 show a further embodiment of a permanent magnet motor 200 of the invention. Components corresponding to the previous embodiments are identified by the same reference numerals. In this embodiment a rotor unit 204 is not standing with its end facing the cutter units but is arranged lying and turned through 90° so that a peripheral side of the rotor unit 204 faces the shaver's cutter units. Accordingly the coupling device 12 is not arranged on an end of the rotor unit 204 but on the peripheral side facing the cutter units. The coupling device 12 likewise has driving pins 13 which in corresponding fashion are in engagement with the cutter units and drive them. As FIGS. 7 and 8 show, the driving pins 13 are arranged perpendicularly to the peripheral side of the rotor unit 204; they stand vertically on the shaft 8 of the rotor unit 204 and project from the peripheral side in radial direction beyond it and extend between one of the two gaps between the two pole shoes of the stator, projecting beyond the stator.

It will be understood that the rotor unit 204 may be constructed as an integral unit. In this instance the driving pins 13 of the coupling device 12 are likewise rigidly connected together. The cutter units which are associated with the various driving pins 13 oscillate in phase in the same direction. The advantage of this construction is that the various cutter units are rigidly coupled in relation to each other.

However, the rotor unit 204 preferably has two mutually independent rotors 204a and 204b (cf. FIG. 8) which are movable independently of each other. To obtain a compact arrangement and a simple structural design of the rotor unit 204, the two rotors 204a and 204b are advantageously aligned coaxially to each other and arranged on a common shaft 8. To obtain a particularly low-vibration operation of the motor, the rotors 204a and 204b are inversely magnetized, that is, the permanent magnets 11 are arranged in opposite orientation on the two rotors 204a and 204b (cf. FIG. 8). Correspondingly, the rotors 204a and 204b and hence the respective cutter units coupled thereto invariably move in opposite directions, whereby the inertias of not only the cutter units but also the rotors counterbalance each other. Vibrations of the housing and noise emissions are thus effectively reduced.

As FIG. 7 shows, the stator frame 7, which is surrounded by the exciter winding 3, lies in a plane which is not perpendicular to the rotor shaft 8 as in the embodiment of FIG. 1 but parallel thereto.

In the embodiment of FIGS. 7 and 8 the reset device 214 includes leaf springs 215 having one of their ends connected to a return spring fixing device 216. With their other ends they are each connected to one of the rotors 204a and 204b in spaced relationship to the rotor shaft 8 by means of a reset coupling element 217. The return springs 215 thus act upon the respective rotor with a resetting force which returns the rotor after any displacements to its position of rest. Although not specifically illustrated, it is also possible for the rotors to be returned to their position of rest by other return springs, in particular it is also possible to use a coil-shaped torsion spring similar to FIG. 3.

Figure 3:
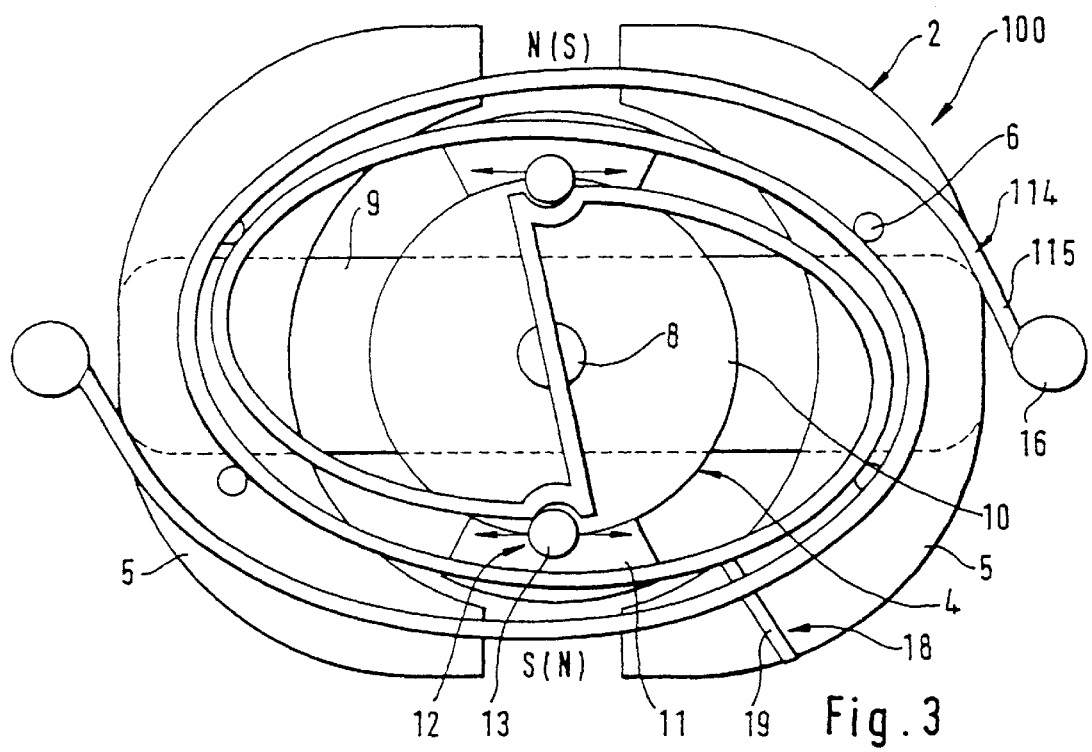
FIG. 3 is a schematic top plan view similar to FIG. 1 of an oscillating single-phase brushless direct current motor of a drive mechanism according to a further embodiment of the invention.
Figure 4:
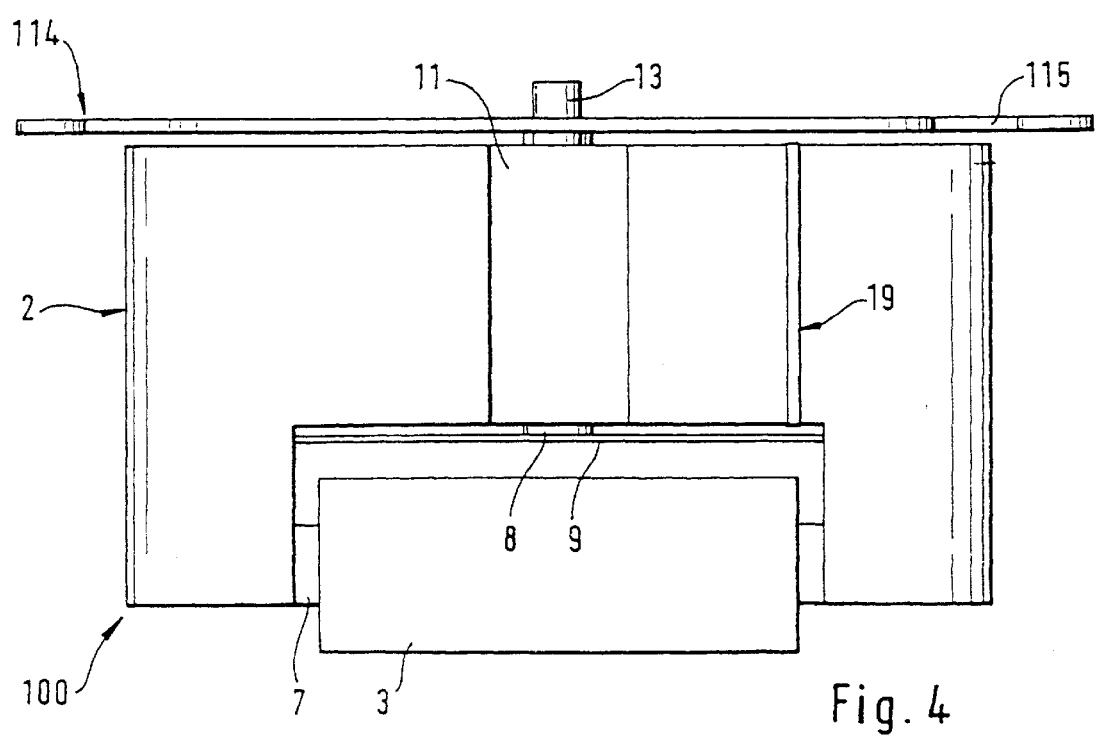
FIG. 4 is a schematic side view of the motor of FIG. 3.

FIG. 9 shows a detail view of the invention embodiment of a dry shaver, in which provision is made for a drive mechanism with a permanent magnet motor 100 similar to the embodiment of FIGS. 3 and 4 with a standing rotor and a coil-shaped torsion spring for resetting the rotor 4. The dry shaver has a shaver housing 27 which accommodates a storage battery 28 for supplying power to the drive mechanism and an actuating unit 29 for actuating the permanent magnet motor 100 (cf. FIG. 9). On an upper end of the shaver housing 27 provision is made for a pivot head 30 which is pivotally mounted on the shaver housing 27 to pivot about a pivot axis 31 relative to said shaver housing 27. In the pivot head 30 provision is made for a pair of cutter units 32 which are disposed underneath a shaving foil 33 arranged on the forward end of the pivot head 30 and are pivotal together with the pivot head 30. The cutter units 32 are caused to oscillate in a reciprocating manner by the permanent magnet motor 100 in a direction parallel to the pivot axis 31.

As FIG. 9 shows, the drive mechanism for the cutter units 32 is integrated in the pivot head 30, enabling it to be pivoted back and forth together with the pivot head 30. For this purpose the pivot head 30 has a drive mount 34 in which the permanent magnet motor 100 is accommodated. The permanent magnet motor 100 is fixedly connected to the pivot head 30. The drive mount 34 is constructed to be approximately complementary to the outer contour of the stator 2 enabling it to be inserted in the drive mount 34 (cf. FIGS. 9 and 10). The drive mount 34 has on one side a projecting seat 35 against which the permanent magnet motor 100 can be pushed. The permanent magnet motor 100 is fixed in place by means of a mounting plate 36 which is fastened to the drive mount 34 and closes it in the manner of a projection (cf. FIG. 10). The rotor 4 is rotatably connected in the area of its two ends to the rotor shaft 8 by a respective bearing arrangement 37. The rotor shaft 8 is connected at both ends of the rotor 4 to end shields 9 which project radially beyond the rotor 4 and are fixedly connected to the stator 2. Instead of the rotatable bearing of the rotor on the shaft 8 it is also possible of course for the rotor shaft 8 to be fixedly connected to the rotor and rotatably supported on the end shields 9.

Figure 13:
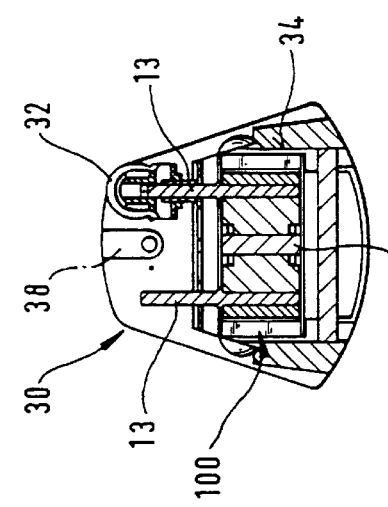
FIG. 13 is a side view of the pivot head in a sectional view taken along the line A—A of FIG. 12.
Figure 12:
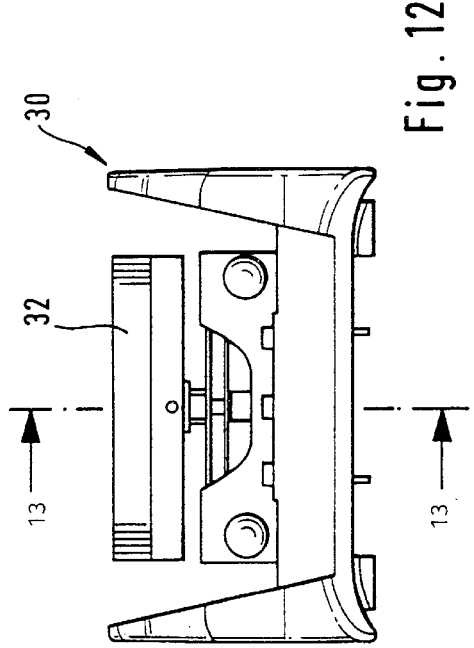
FIG. 12 is a side view of the pivot head, with the drive mechanism integrated inside, according to the embodiment of FIGS. 9 to 11.
Figure 14:
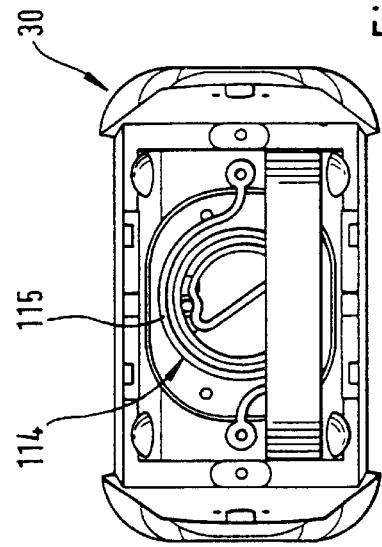
FIG. 14 is a top plan view of the pivot head according to the embodiment of FIGS. 9 to 13.
Figure 18:
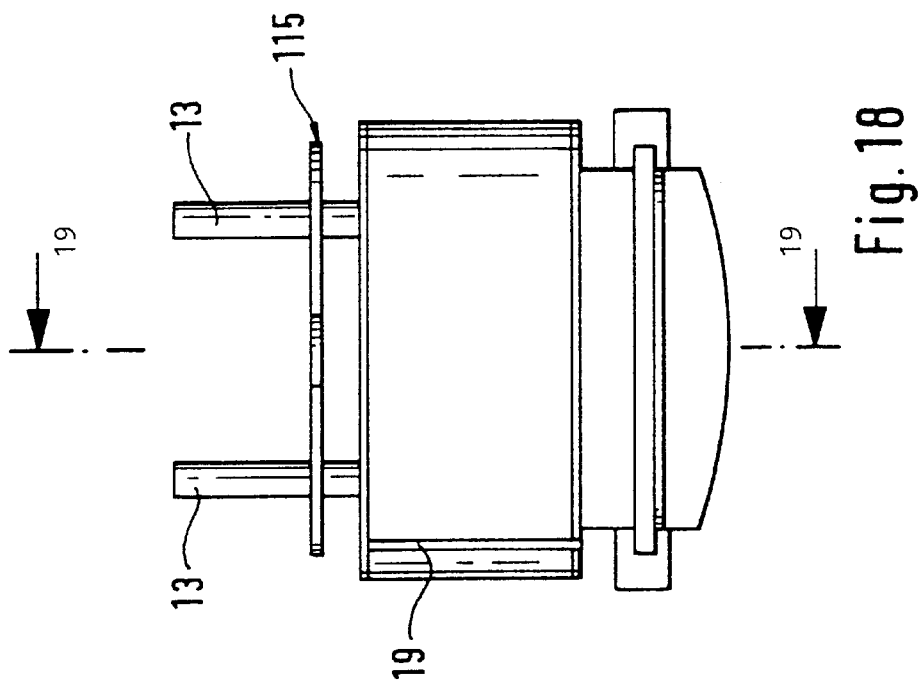
FIG. 18 is a non-sectional view of the motor in a perspective similar to FIG. 16.
Figure 19:
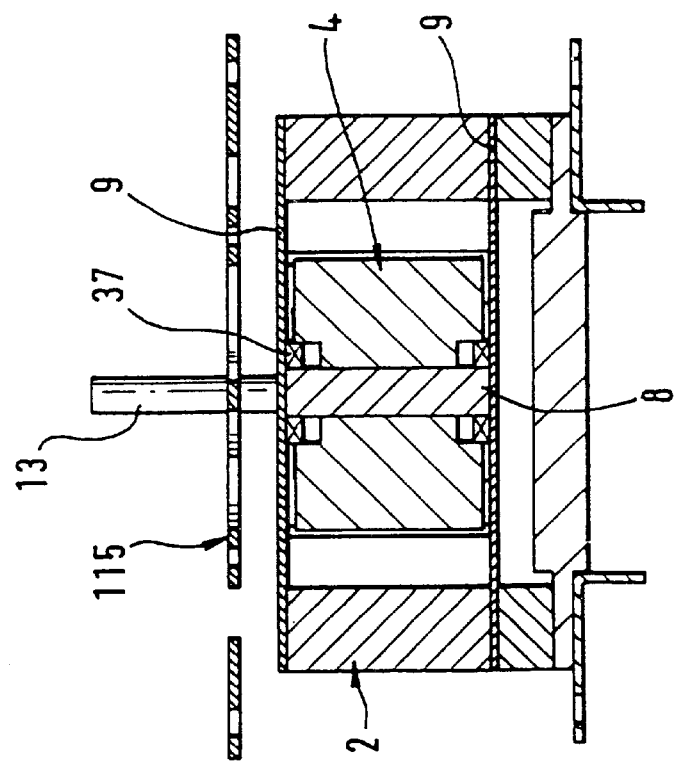
FIG. 19 is a longitudinal sectional view of the motor taken along the line B—B of FIG. 18.

The cutter units 32 sit directly on the driving pins 13 projecting toward the forward end of the pivot head 30 (cf. FIG. 13) and are oscillatingly driven by said pins in accordance with the movement of the rotor 4. The driving device for coupling the central cutter 38 is not illustrated in FIG. 13; only one of the two cutter units 32 is shown.

Figure 20:
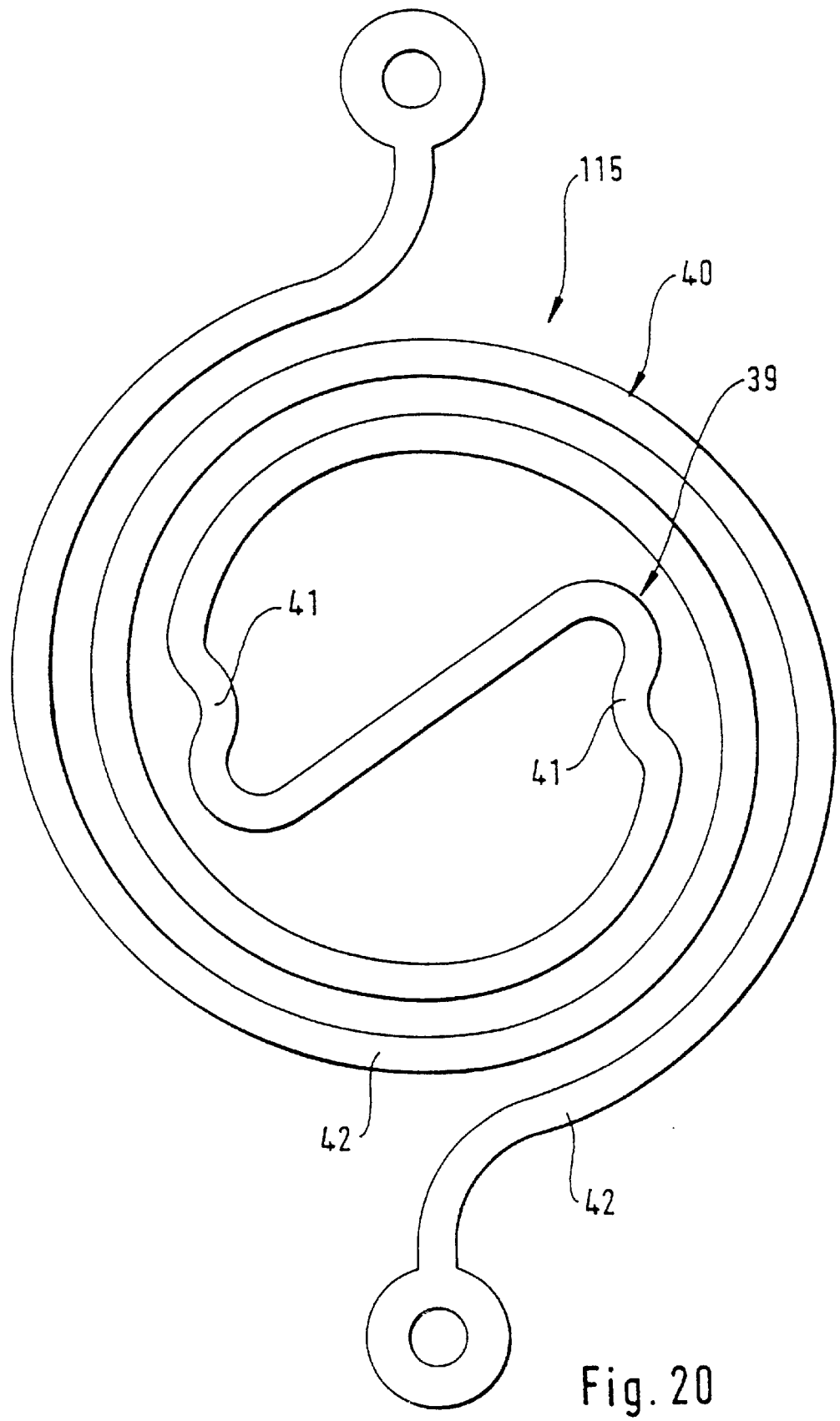
FIG. 20 is an enlarged top plan view of the return spring of FIG. 17.

As reset device 114 for the rotor 4 the drive mechanism includes a return spring 115 which is seated between the cutter units 32 and the upper end of the rotor 4 (cf. FIGS. 10, 13, 16 and 17). The return spring 115 is shown in more detail in FIG. 20. It has a fastening section 39 for fastening to the rotor 4 and a coil section 40 surrounding the fastening section 39. The spring is of a plane configuration on the whole. As FIG. 20 shows, the fastening section 39 is constructed in an essentially Z-shaped configuration and has a pair of engagement sections 41 lying opposite and essentially parallel to each other, with which the return spring 115 can be held in tension between the driving pins 13. The engagement sections 41 have dish-shaped depressions provided to accommodate the driving pins 13 (cf. FIG. 17). The coil section 40 has a pair of coil arms 42 which extend outwardly in spiral form from the engagement sections 41 (cf. FIG. 20). The ends of the coil arms 42 are fixedly connected to the pivot head 30. The return spring 115 made of spring steel exerts a resetting force on the driving pins 13 which return the rotor 4, if displaced, to its position of rest so that it can perform rotary oscillations about the position of rest. In combination with the mass of the rotor 4 and the mass of the cutter units 32, the return spring 115 is constructed such that the resonant frequency of the spring-and-mass system is very high, preferably in the range of $10^4$/minute, approximately.

Provision is preferably made for one or several rotors with several (in particular a total of two) cutter units or cutter blocks, which in relation to the stator define an oscillation system with individual masses M1, M2 and individual force constants K1 and K2, in which the ratio of force constant to mass for one oscillation system is maintained approximately equal to that for another oscillation system. The masses in the oscillation systems are approximately identical.

The processes of actuating and controlling the permanent magnet motor will be described in more detail in the following. The previously described embodiments of the permanent magnet motor can be actuated and controlled in the same way.

Figure 22:
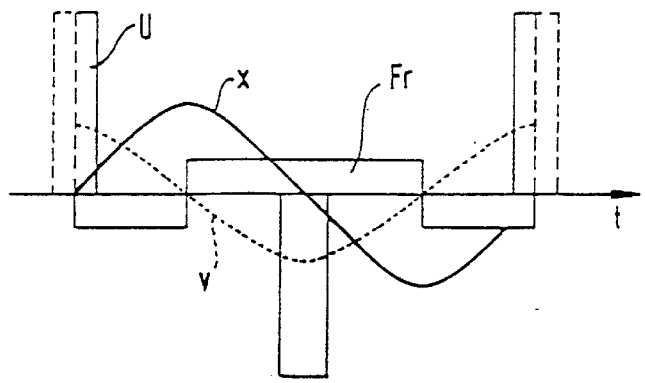
FIG. 22 is a graph showing the operating mode of the motor, in particular the rotor displacement, the rotor speed and the drive pulses plotted against time.

The permanent magnet motor is supplied with electric energy of low voltage from the storage battery, but it is not fed with a direct voltage but with a switched voltage. The actuating unit 29 supplies the exciter winding 3 with bipolar voltage pulses (cf. U in FIG. 22). The voltage pulses drive the rotor approximately in the zero passages of oscillation where the speed is at a maximum. With the positive and negative pulses it is possible to accelerate the rotor 4 in the proper direction during its reciprocating motion. To enable the actuating unit 29 to control the rotor oscillation precisely, the instantaneous oscillation status of the rotor 4 has to be detected as accurately as possible and a corresponding signal has to be made available which can be fed back to the actuating unit 29. The processing of signals by the detecting device 18 will be explained in more detail in the following.

Figure 21:
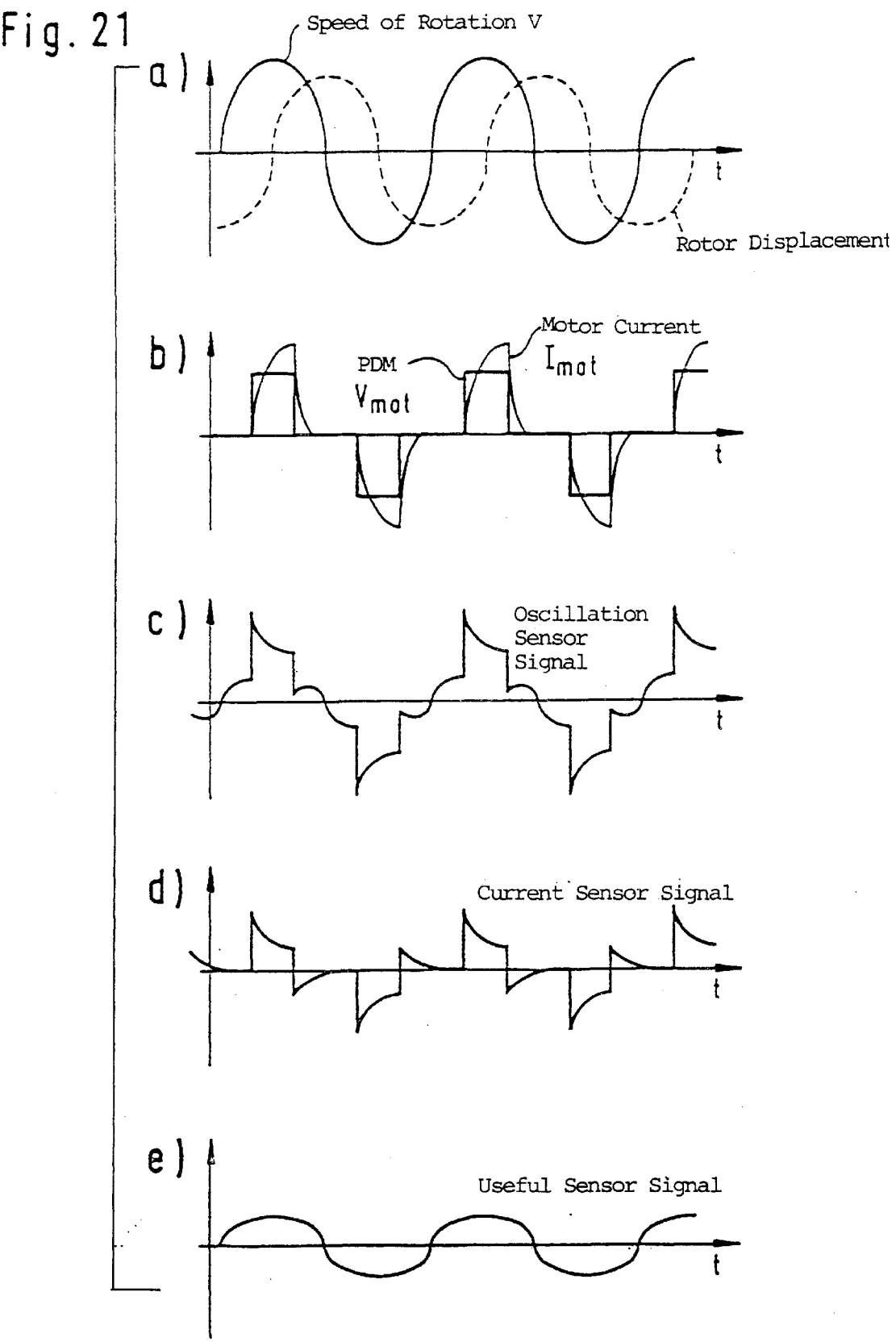
FIG. 21 is a family of curves showing, plotted against time, (a) the rotational speed and the displacement of the rotor, (b) the drive pulses and the motor current, (c) the output signal of an oscillation sensor device, (d) the output signal of a current sensor, and (e) the useful signal corresponding to the rotational speed of the oscillation sensor device which is corrected of the impact of a voltage induced by the motor current.

The magnetic flux which is created by the permanent magnets 11 and produces an induction voltage in the sensor coil is detected with the sensor coil 19. FIG. 21C shows the variation with time of the voltage induced in the sensor coil 19 when the rotor 4 oscillates at the speed of rotation shown in FIG. 21A. The oscillation sensor signal, that is, the voltage induced in the sensor coil 19, is superimposed by interference components. A low-pass filter 43 at the sensor signal processing input dampens harmonic waves of higher frequency in order to obtain a signal proportional to the speed of rotation of the rotor. However, this reduction of interference components is not enough. In addition to the flux of the permanent magnets 11, the magnetic flux of the exciter coil 3 which is proportional to the motor current, that is, to the current in the exciter coil 3, induces in the sensor coil 19 a voltage whose fundamental wave is likewise contained in the output signal of the input filter. If the fundamental wave of this current component were ignored, it would corrupt, as an error content in the signal of the sensor coil 19, the detection of the oscillation of the rotor 4 and cause malfunctions in the operation of the motor. A compensating device for compensating this error content includes a current sensor for detecting the current in the exciter winding 3, by means of which the current in the exciter winding 3 is separately detected. This current sensor may be comprised of a soft magnetic ring through which a conductor of the motor's current supply is passed. The flow of motor current induces in a second wire, which may be applied to the ring in several turns, a voltage which is made available as a current sensor signal and exhibits the variation with time shown in FIG. 21D when the motor current $I_{mot}$ in the exciter winding 3 exhibits the variation with time shown in FIG. 21B. In the characteristic of the motor current $I_{mot}$ shown in FIG. 21B it should be noted that, when the exciter winding 3 is actuated with voltage pulses which in FIG. 21B are identified by PDM, the motor current created by the step-like rectangular voltage pulses does not increase in steps but, on account of the inductance of the exciter winding 3, adopts the shark-fin characteristic shown in FIG. 21B.

The voltage induced in the current sensor is proportional to the characteristic of the current component, that is, the error content, in the signal of the sensor coil 19. In this connection it should be noted that, on account of the motor's design, the effect of the angle of rotation of the rotor 4 on the characteristic of the exciter flux is negligible. The permanent magnet motor 100 uses a rotor 4 with a circular cross-section and permanent magnets 11 whose permeability differs only slightly from the property of the air gap, hence the effect of the angle of rotation of the rotor 4 approximates to being negligible. By subtracting the current sensor signal of the current sensor of FIG. 21D from the output signal of the sensor coil 19 of FIG. 21C in accordance with their corresponding weighting, the error content can be almost completely compensated. For this purpose the compensating device possesses a suitable subtraction unit for subtracting the current sensor signal from the signal of the sensor coil 19.

After subsequent low-pass filtering of the difference between the two signals by means of a low-pass filter, the result is then a signal characteristic which is a measure of the speed of rotation of the rotor in all operating states of the motor independent of the pulse duty factor, that is, the duration of the voltage pulses. The signal characteristic is presented in FIG. 21E and is identified as the useful sensor signal. Operation of the motor with a constant speed of the cutter units at its resonant frequency is thus possible for different loads.

Figure 23:
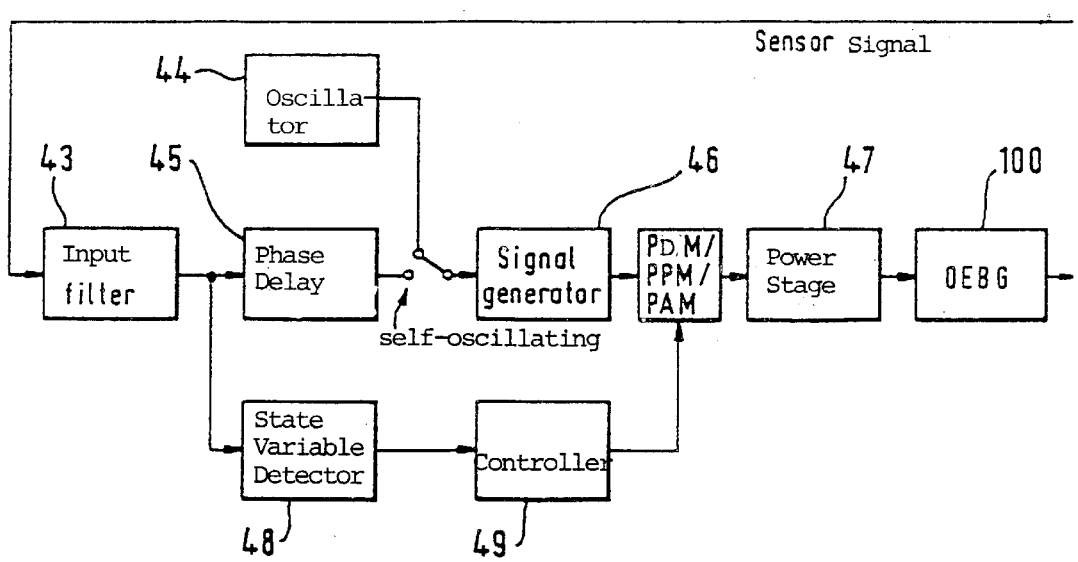
FIG. 23 is a block diagram of an actuating unit for actuating the motor either with a fixed frequency or in a self-oscillating loop with feedback of a sensor signal synchronous with the rotor oscillation.

FIG. 23 shows the block diagram of the complete system comprised of the permanent magnet motor 100 and the actuating unit 29. As FIG. 23 shows, the upper signal path can be operated between operation of the motor in a self-oscillating loop or operation of the motor with a fixed frequency preset by an oscillator 44. The lower signal path represents the control of the oscillation state of the rotor 4.

The input filter 43 contains the above described low-pass filter and the compensating device for compensating the error content in the signal of the sensor coil 19 and adapts the level of the sensor signal. If the useful sensor signal is superimposed by interference quantities such as harmonic waves, such interference quantities will be dampened in the input filter 43.

During operation of the drive mechanism in a self-oscillating loop the oscillation frequency of the permanent magnet motor 100 is determined by the frequency at which the phase shift between the points 1 and 1' of the signal path of FIG. 23 amounts to 360° with an open loop. This frequency is adjusted to the resonance maximum by means of an adjustable phase delay device 45 between the points 2 and 3 of the signal path. A subsequent signal generator 46 generates a signal synchronous to the rotor oscillation which defines the sequence of the bipolar drive voltage pulses which drive the motor 100 via a power stage 47 such as a full bridge.

With fixed frequency actuation of the motor the oscillator 44 fixes the frequency of the signal generator and hence the sequence of the bipolar voltage pulses, the frequency being preferably fixed at approximately the resonant frequency of the spring-and-mass system comprised of the rotor 4 and the reset device 114.

To control the operation of the motor the filtered useful sensor signal of FIG. 21E is fed to a detector 48 which calculates from this signal the actual value of the state variable to be controlled. With the periodic signal characteristic of FIG. 21E this is preferably a peak value detector which detects the respective peak value of this signal. One-way rectification permits the detection of an actual value per period of oscillation; two-way rectification permits two detected values per period and hence a faster response of the controller to load surges, for example. It would also be possible to use a mean value of the useful sensor signal as actual value, for example the effective value. However, the amplitude of the useful sensor is preferably used. The detected actual value is fed to the controller 49 which may be configured in analog technology as a PI controller, for example. Alternatively it is possible to subject the detected state variable to analog-to-digital conversion and perform the control in digital technology using a switch mechanism or an M controller.

To control the oscillation state the output signal of the signal generator is modulated by the controller 49. It will be understood that this modulation may take place in various ways, for example by pulse-phase modulation (PPM), by pulse-amplitude modulation (PAM) or by pulse-duration modulation (PDM). The preferred pulse-duration modulation option will be explained in more detail in the following with reference to the detailed block diagram of the self-oscillating actuation of FIG. 24. The loop structure of the system is clear to see in this diagram. On the left side of the diagram the signals of the detecting device 18 are fed back to the actuating unit 29 via the input filter 43. The useful sensor signal is fed to the phase shifter 45 which determines the phase delay and hence the operating frequency of the motor.

Figure 25:
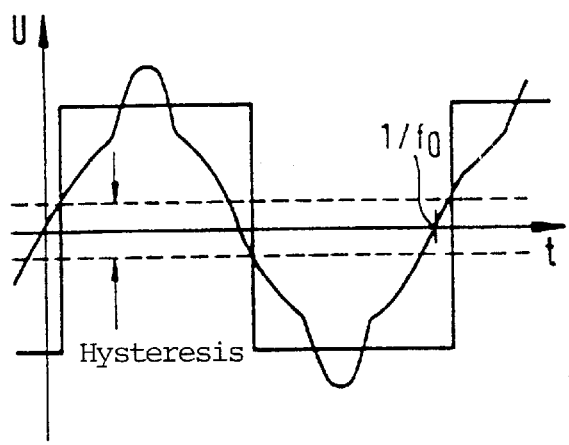
FIG. 25 is a graph showing the useful sensor signal of FIG. 21(e) and its processing over time, the useful sensor signal being large compared to interference components.
Figure 26:
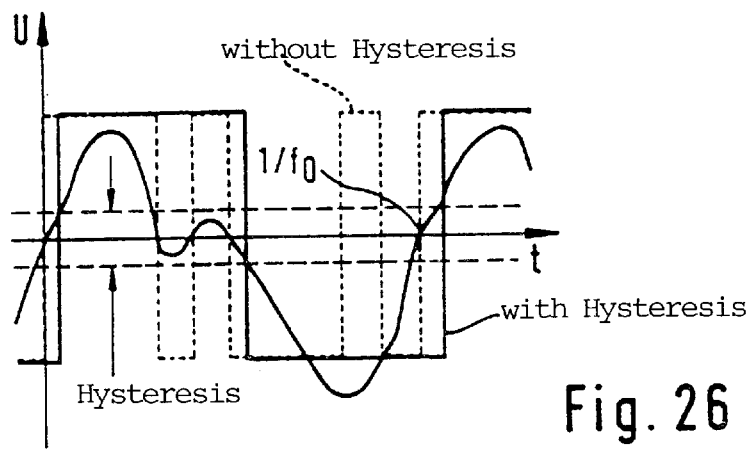
FIG. 26 is a graph similar to FIG. 25, in which the useful sensor signal is relatively small in relation to interference components and the processing is shown with and without hysteresis.

To generate a bipolar voltage pulse signal the useful sensor signal is first transformed in the signal generator 46 into a synchronous rectangular signal. This is done using a comparator 50 (cf. FIG. 24). The rectangular signal, which is used for generation of the bipolar voltage pulses, has to be in a fixed phase relationship to the oscillation of the rotor 4 in every operating state of the motor. The rectangular signal is generated synchronously to the zero passages of the useful sensor signal by the comparator 50, as is illustrated in FIGS. 25 and 26 with reference to two half-waves of the useful sensor signal. If harmonic waves in the useful sensor signal are adequately dampened by the input filter 43, these interference components will also be small in the area of the zero passages compared to the useful sensor signal, and the characteristic shown in FIG. 25 will result.

If the remaining harmonic content is too high, this may result in multiple passages through zero within a half period of oscillation of the rotor 4, as illustrated in FIG. 26. This would produce a faulty rectangular signal. For this reason the comparator 50 is configured with a hysteresis so that, regardless of any remaining interference quantities in the useful sensor signal, the result is a rectangular signal that meets the requirements.

Figure 24:
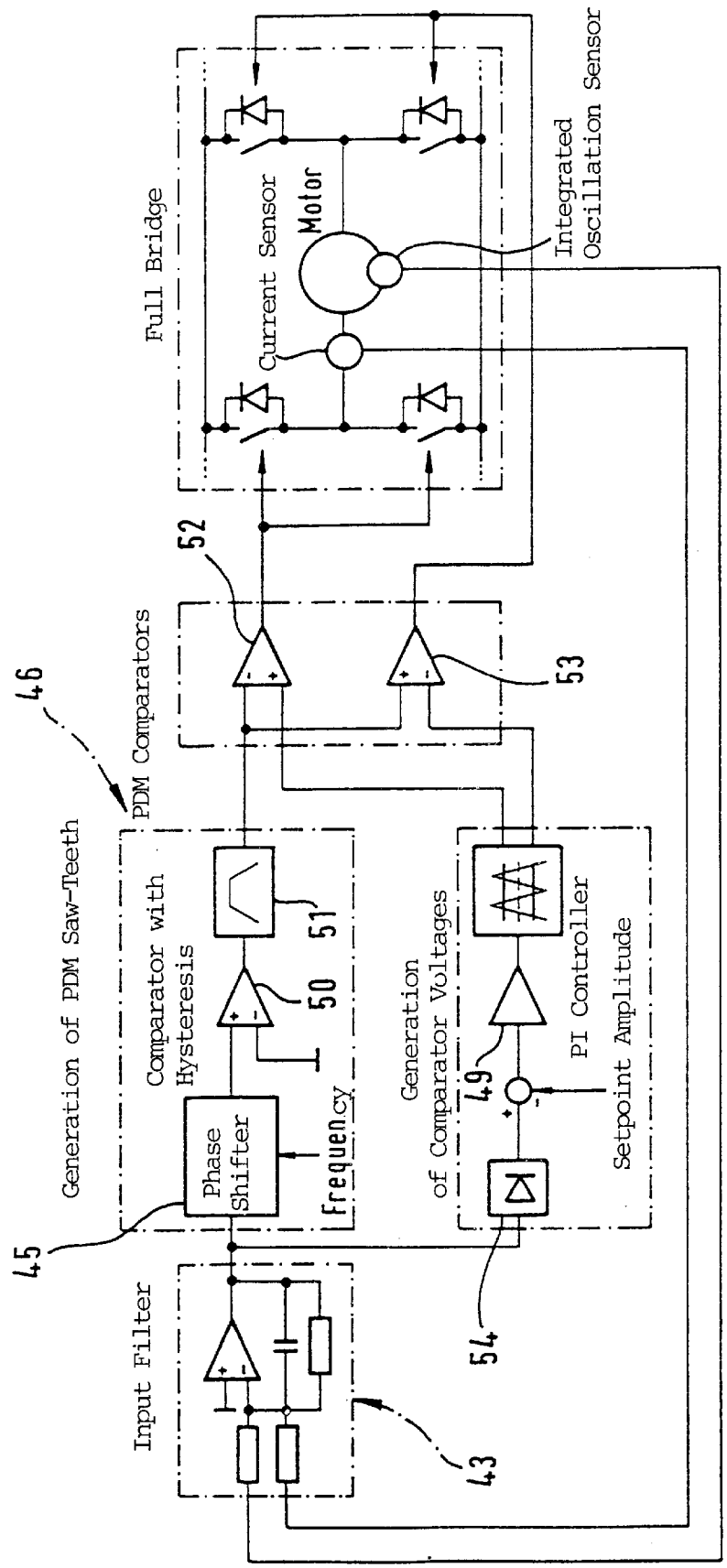
FIG. 24 is a block diagram of the actuating unit of the motor with pulse-duration modulation of the drive pulses in a self-oscillating loop.

The rectangular signal is fed to a signal generator 51 which is constructed as a bandpass filter (cf. FIG. 24). The corner frequencies of the bandpass filter are selected so that the bandpass filter supplies an approximately triangular output signal. If, due to interference components in the useful sensor signal, the fed rectangular signal has an asymmetric pulse duty factor, the decoupling of direct voltage components in the bandpass filter will ensure a triangular signal with a characteristic symmetrical to the reference potential.

Figure 27:
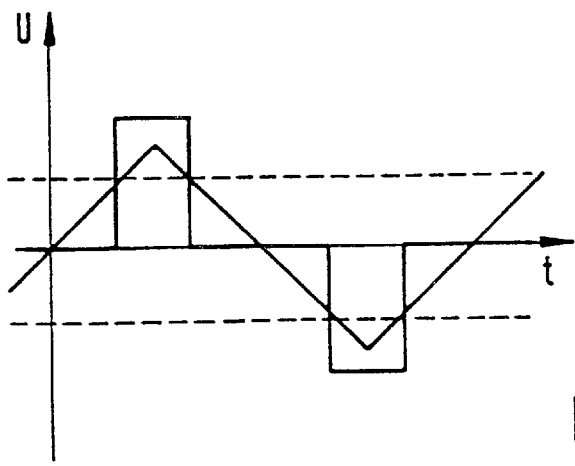
FIG. 27 is a graph showing the generation of the pulse-duration-modulated drive pulses over time.

The triangular signal provided by the signal generator 51 is compared to two variable direct voltage signals in a subsequent stage by means of two comparators 52 and 53 (cf. FIG. 27). The duration of the bipolar voltage pulses is defined by the points of intersection of the direct voltage signal with the triangular signal. In this way a positive voltage pulse is generated from the upper direct voltage signal and the triangular signal, and a negative voltage pulse from the lower direct voltage signal and the triangular signal. The pulse duration of these voltage pulses can be varied, that is, modulated (pulse-duration modulation), by shifting the upper direct voltage level up or down and the lower direct voltage level simultaneously down or up. This method of generating the pulse-duration modulation results in a symmetrical widening or narrowing of the drive pulses symmetrical with the peaks of the triangular signal (cf. FIG. 27). On account of the fixed phase relationship between the useful sensor signal and the triangular signal a rigid phase coupling is maintained between the fed back useful sensor signal of the detecting device 18 and the fundamental wave of the drive pulses even on a variation of the pulse duty factor. This ensures operation of the motor in a constant phase relationship between driving voltage and rotor speed and hence in resonance in the presence of different loads. This results in an improved level of efficiency of the drive compared to a pulse-duration modulation in which the starting instant of the drive pulses is predetermined and the duration of the drive pulses is fixed only by variation of the ending instant and, correspondingly, a phase shift dependent on the pulse duty factor is caused between the fed back sensor signal and the fundamental wave of the drive pulses.

To control the oscillation state of the permanent magnet motor 100 the useful sensor signal of the detecting device 18, filtered and liberated of error content, is fed to the peak value detector 54 which determines the respective amplitude of the oscillations of the useful sensor signal. Due to compensation of the error content this amplitude value is a direct measure of the maximal speed of rotation of the rotor 4. The detected amplitude value is compared to a setpoint value and the difference signal fed to a suitable controller, for example a PI controller 49. The controller output signal controls the simultaneous displacement of the two direct voltage levels, which determine the voltage pulse duration of the drive pulses, thus effecting control of the oscillation amplitude.

As an alternative to analog control it is possible according to a further embodiment of the invention to implement the function of the triangular signal by a digital circuit in the form of an up-down counter. In the subsequent stage the counter reading is then compared, using digital comparators, to the output value of a digital controller, and the bipolar voltage pulse is generated in this way.

The setpoint value of the speed of rotation fed to the controller 49 can be predetermined as a fixed value. In an embodiment of the invention the setpoint value can be varied by the user of the dry shaving apparatus in discrete steps or infinitely within predetermined limits. In this way the speed of the cutter arrangement is user-adjustable within predetermined limits so that an optimal shave is achieved with minimal skin irritation for every type of skin. Alternatively it is possible, by allowing for the functional relationship between speed and amplitude of oscillation of the cutter arrangement, to preselect the amplitude of oscillation at a given frequency of oscillation. The controller then calculates the matching speed for the given frequency of oscillation and controls the energy supplied to the drive in such a way that the amplitude of oscillation remains constant under different loads.

In the drive mechanism according to the invention it is particularly advantageous that the control of oscillation can be performed very quickly. The pulse duration of the drive pulses can be influenced from one half-wave to the next half-wave. This leads to a constant quality of shave and a shortening of shaving time. Such speedy control is not possible with conventional drives with their insufficiently rigid coupling between the motor shaft and the cutter arrangement. Hence with these drives, control can only achieve an oscillation that is constant on a time average.

We claim:

1. A drive mechanism for driving a coupling device (12, 13) in a rotary oscillating manner couplable in driving relation with a working unit (32) of an electric product of personal use, said drive mechanism comprising a permanent magnet motor (1, 100, 200) having a stator (2) with an exciter winding (3) and a rotor (4, 204) with at least one permanent magnet (11) positioned in a stator field and rotatably mounted on a shaft (8), a reset device (14, 114, 214) for returning the rotor to a position of rest in such a way as to enable the rotor to oscillate about the position of rest, a coupling device (12) for coupling the rotor to the working unit, wherein the coupling device is connected to the rotor in spaced relationship to the rotor shaft, a detecting device (18) for detecting oscillatory motions of the rotor, an actuating unit (29) for actuating the permanent magnet motor in response to the detected oscillatory motion, and a frequency control element (44; 45, 46, 47, 49) for actuating the permanent magnet motor with a frequency corresponding approximately to a resonant frequency of the rotor.

2. The drive mechanism as claimed in claim 1, wherein the rotor (4, 204) has a core (10) comprising a soft magnetic material of high permeability and poles (11) comprising a permanent magnetic material.

3. The drive mechanism as claimed in claim 1, wherein the rotor (4) consists substantially of permanent magnetic material.

4. The drive mechanism as claimed in claim 1, wherein the reset device (14, 114, 214) is connected to the rotor (4) in spaced relation to the rotor shaft (8).

5. The drive mechanism as claimed in claim 1, wherein the reset device (14, 114) is operatively associated with the coupling device (12).

6. The drive mechanism as claimed in claim 1, wherein the reset device (114) comprises a return spring (115) with a fastening section (39) for fastening to the rotor (4) and a coil section (40) surrounding the fastening section.

7. The drive mechanism as claimed in claim 1, wherein the reset device (114) has a generally planar configuration.

8. The drive mechanism as claimed in claim 6, wherein the fastening section (39) is constructed in a generally Z-shaped configuration with a pair of engagement sections (41) lying opposite and generally parallel to each other, and the coil section (40) is provided with a pair of coil arms (42) extending outwardly in spiral shape from the engagement sections.

9. The drive mechanism as claimed in claim 1, wherein the coupling device (12) is kinematically rigid in a first direction of movement of the working unit (32) and kinematically resilient in a second direction perpendicular to the first direction of movement of the working unit.

10. The drive mechanism as claimed in claim 1, wherein the coupling device (12) includes a first coupling element (13) which is fixedly connected to the rotor (4, 204), and a second coupling element which is fixedly connectable to the working unit, said first and second coupling elements being in engagement with each other.

11. The drive mechanism as claimed in claim 10, wherein the first coupling element (13) is a pin and the second coupling element is a recess (24).

12. The drive mechanism as claimed in claim 1, wherein a pair of coupling devices (12) are associated with respective working units (32) and arranged on opposing sides of the shaft (8) of the rotor (4) such that the working units are driven in counter-running direction.

13. The drive mechanism as claimed in claim 12, wherein the coupling devices (12) are rigidly interconnected by the rotor (4).

14. The drive mechanism as claimed in claim 1, further comprising a plurality of said rotors (204), each of which is associated with a respective said working unit (32).

15. The drive mechanism as claimed in claim 14, wherein the rotors (204) have different directions of magnetization such as to oscillate in opposite directions to each other.

16. The drive mechanism as claimed in claim 1, wherein the coupling device (12) is arranged on an end of the rotor (4).

17. The drive mechanism as claimed in claim 1, wherein the coupling device (12) is arranged on a peripheral side of the rotor (204).

18. The drive mechanism as claimed in claim 1, wherein the detecting device (18) is integrated in the stator (2).

19. The drive mechanism as claimed in claim 1, wherein the detecting device (18) comprises a sensor device (19) for detecting a magnetic flux created by the permanent magnet (11) of the rotor (4, 204).

20. The drive mechanism as claimed in claim 19, wherein the detecting device (18) further comprises a compensating device (43) to compensate for an error content in a signal of the sensor device (19).

21. The drive mechanism as claimed in claim 20, wherein the compensating device (43) has a current sensor for detecting a motor current ($I_{mot}$) and a subtraction unit for subtracting a current sensor signal from the signal of the sensor device (19).

22. The drive mechanism as claimed in claim 1, wherein the actuating unit (29) comprises a control device (49) to control the electric energy fed to the motor in response to the oscillatory motion of the rotor (4, 204).

23. The drive mechanism as claimed in claim 22, wherein the control device (49) comprises a peak value detector (54) for detecting a signal peak value from the detecting device (18) and controls the energy fed to the motor in response to the detected peak value.

24. The drive mechanism as claimed in claim 1, wherein the actuating unit (29) further comprises a signal generator (46) for producing bipolar voltage pulses and a modulating device (50, 51, 52, 53, 49) for modulation of the voltage pulses as a function of the oscillatory motion of the rotor (4, 204).

25. The drive mechanism as claimed in claim 24, wherein the signal generator (46) is configured such that the voltage pulses are generated in a constant phase relationship to the oscillatory motion of the rotor (4, 204).

26. The drive mechanism as claimed in claim 22, wherein the actuating unit (29) further comprises a signal generator (46) for producing bipolar voltage pulses and a modulating device (50, 51, 52, 53, 49) for modulation of the voltage pulses as a function of the oscillatory motion of the rotor (4, 204), and wherein the control device (49) generates at least one variable direct voltage level which is compared by comparators (52, 53) to a triangular signal generated by the signal generator (51) synchronously with the oscillation of the rotor (2, 204), and wherein pulse-duration modulation effects a variation and control of the energy supplied to the motor as well as a control of the amplitude of oscillation of the working unit.

27. The drive mechanism as claimed in claim 1, wherein the frequency control element further comprises an oscillator (44) for actuating the rotor with a predetermined frequency.

28. The drive mechanism as claimed in claim 1, wherein the frequency control element further comprises a self-oscillating feedback loop.

29. A dry shaver in combination with the drive mechanism according to claim 1, further comprising a shaver housing (27), a pivot head (30) pivotal relative to the shaver housing, and at least one cutter unit (32) disposed in the pivot head and adapted to be driven by the drive mechanism, said drive mechanism being disposed in the pivot head.

30. The dry shaver combination as claimed in claim 29, wherein the drive mechanism with the shaft of the rotor (4) is arranged in a standing position.

31. The dry shaver combination as claimed in claim 29, wherein the drive mechanism with the shaft of the rotor (204) is arranged in a lying position.

32. The dry shaver combination as claimed in claim 29, wherein two said cutter units (32) and a long hair cutter (38) are arranged in the pivot head and driven by the drive mechanism.

33. The drive mechanism as claimed in claim 14, wherein said shaft (8) is common to said plurality of rotors (204).

34. The drive mechanism as claimed in claim 28, wherein the self-oscillating feedback loop of the frequency control element further comprises a phase shifter (45) for the signal of the detecting device (18), a signal generator (46) for generating bipolar voltage pulses, a power stage (47) for actuating the motor, and a control device (49) for controlling the electric energy fed to the motor.

35. The dry shaver combination as claimed in claim 30, wherein the shaft of the rotor (4) intersects a pivot axis of the pivot head.

* * * * *